United States Patent [19]

Brant et al.

[11] Patent Number: 5,444,145
[45] Date of Patent: Aug. 22, 1995

[54] ETHYLENE/BRANCHED OLEFIN COPOLYMERS

[75] Inventors: Patrick Brant, Seabrook; Jo Ann M. Canich; Natalie A. Merrill, both of Webster, all of Tex.

[73] Assignee: Exxon Chemical Patents Inc., Wilmington, Del.

[21] Appl. No.: 81,960

[22] Filed: Jun. 24, 1993

Related U.S. Application Data

[63] Continuation of Ser. No. 871,248, Apr. 20, 1992, abandoned.

[51] Int. Cl.$^6$ .................. C08F 10/14; C08F 210/14
[52] U.S. Cl. .................. 526/348.3; 526/348.1; 526/348.2; 526/348.4; 526/348.6; 526/127; 526/160
[58] Field of Search .............. 526/348.1, 348.2, 348.3, 526/348.4, 348.6

[56] References Cited

U.S. PATENT DOCUMENTS

| | | | |
|---|---|---|---|
| 4,205,021 | 5/1980 | Morita et al. | 526/348.4 |
| 4,287,328 | 9/1981 | Kikuta et al. | 526/115 |
| 4,321,345 | 3/1982 | Sato et al. | 526/115 |
| 4,405,774 | 9/1983 | Miwa et al. | 526/348.4 |
| 4,411,854 | 10/1983 | Maurer et al. | 526/348.1 |
| 4,436,689 | 3/1984 | Smith et al. | 526/348.1 |
| 4,438,238 | 3/1984 | Fukushima et al. | 525/240 |
| 4,668,752 | 5/1987 | Tominari et al. | 526/348.4 |
| 4,883,853 | 11/1989 | Hobes et al. | 526/329 |
| 5,017,665 | 5/1991 | Chang | 526/129 |
| 5,087,677 | 2/1992 | Brekner et al. | 526/160 |
| 5,153,157 | 10/1992 | Hlatky et al. | 502/117 |
| 5,272,236 | 12/1993 | Lai et al. | 526/348.5 |

FOREIGN PATENT DOCUMENTS

| | | |
|---|---|---|
| 0273654 | 12/1987 | European Pat. Off. . |
| 254022 | 1/1988 | European Pat. Off. . |
| 283958 | 9/1988 | European Pat. Off. . |
| 420436 | 4/1991 | European Pat. Off. . |
| 57-195704 | 12/1982 | Japan . |
| 195704 | 12/1982 | Japan . |
| 61-221206 | 3/1985 | Japan . |
| 63039905 | 4/1986 | Japan . |

OTHER PUBLICATIONS

Shirayama, K, et al. Die. Makrol. Chemie 151 (1972) 97–120.
A. H. Willbourn, J. Polym. Sci. 34 (1959) 569.
D. A. Boyle, et al. Polymer 2 (1961) 335.
K. Casey, et al. J. Polym. Sci. B2 (1964) 1053.

*Primary Examiner*—David W. Wu
*Attorney, Agent, or Firm*—Catherine Bell

[57] ABSTRACT

High molecular weight copolymers of ethylene and 0.5–10 mole percent branched α-olefins are disclosed. The polymers have $M_w$ of 30,000–1,000,000, MWD of 2–4, a density of 0.85–0.95 g/cm$^3$, and a high composition distribution breadth index. Also disclosed are a method for making the polymers with a cyclopentadienyl metallocene catalyst system, and films, fibers, molded articles and other products made from the copolymers.

30 Claims, 11 Drawing Sheets

ETHYLENE/BRANCHED OLEFIN COPOLYMERS

This is a continuation of application Ser. No. 07/871,248, filed Apr. 20, 1992 now abandoned.

FIELD OF THE INVENTION

This invention relates to copolymers of ethylene and branched α-olefins, and more particularly to tough, high strength copolymers thereof. This invention also relates to a process for copolymerizing ethylene with branched α-olefins utilizing certain transition metal compounds from Group IV B of the Periodic Table of Elements that produces high molecular weight copolymers.

BACKGROUND OF THE INVENTION

As far as Applicants are aware, it has not been possible to prepare ethylene copolymers with many branched α-olefin comonomers, particularly where the branch is in the 3-position, with sufficiently high molecular weight for most applications, using a traditional Ziegler-Natta catalyst.

It has been proposed to use certain metallocenes such as bis(cyclopentadienyl) titanium or zirconium dialkyls in combination with aluminum alkyl/water cocatalyst as a homogeneous catalyst system for the polymerization of olefins in general. For example: German Patent Application 2,608,863 teaches the use of a catalyst system for the polymerization of ethylene consisting of bis(cyclopentadienyl) titanium dialkyl, aluminum trialkyl and water; German Patent Application 2,608,933 teaches an ethylene polymerization catalyst system consisting of zirconium metallocenes of the general formula (cyclopentadienyl)$_n$ZrY$_{4-n}$, wherein n stands for an integer in the range of 1 to 4, Y for R, CH$_2$AlR$_2$, CH$_2$CH$_2$AlR$_2$ and CH$_2$CH(AlR$_2$)$_2$, wherein R stands for alkyl or metallo alkyl, an aluminum trialkyl cocatalyst and water; European Patent Application No. 0035242 teaches a process for preparing ethylene and atactic propylene polymers in the presence of a halogen-free Ziegler catalyst system of (1) cyclopentadienyl compound of the formula (cyclopentadienyl)$_n$MY$_{4-n}$ in which n is an integer from 1 to 4, M is a transition metal, especially zirconium, and Y is either hydrogen, a C$_1$–C$_5$ alkyl or metallo alkyl group or a radical having the following general formula CH$_2$AlR$_2$, CH$_2$CH$_2$AlR$_2$, and CH$_2$CH(AlR$_2$)$_2$ in which R represents a C$_1$—C$_5$ alkyl or metallo alkyl group, and (2) an alumoxane; and U.S. Pat. No. 4,564,647 teaches a low pressure process for polymerizing ethylene, either alone or in combination with small amounts of other α-olefins, in the presence of a catalyst which may comprise a cyclopentadienyl compound, represented by the formula (Cp)MR$^2$R$^3$R$^4$ wherein (Cp) represents a cyclopentadienyl group, M represents titanium, vanadium, zirconium or hafnium, and R$^2$, R$^3$ and R$^4$ are each an alkyl group having from 1 to 6 carbon atoms, a cyclopentadienyl group, a halogen atom or a hydrogen atom, an alumoxane, which can be prepared by reacting trialkyl aluminum or dialkyl aluminum monohalide with water and a filler. Each of the above patents also teach that the polymerization process employing the homogeneous catalyst system is hydrogen sensitive thereby providing a means to control polymer molecular weight.

As is well known in the prior art, catalyst systems comprising a cyclopentadienyl compound, hereinafter frequently referred to as a metallocene or metallocene catalyst component, and an alumoxane offer several distinct advantages when compared to the more conventional Ziegler-type catalyst systems. For example, the cyclopentadienyl-transition metal/alumoxane catalyst systems, particularly those wherein the cyclopentadienyl compound contains at least one halogen atom, have demonstrated extremely high activity in the polymerization of α-olefins, particularly ethylene. Moreover, these catalyst systems produce relatively high yields of polymer product having a relatively narrow molecular weight distribution. However, these catalyst systems, when used to prepare copolymers of ethylene with branched α-olefins in anything more than a very minor proportion, still suffer from the drawbacks of low incorporation rates, and low molecular weights.

For many applications it is of primary importance for a polyolefin to have a high weight average molecular weight while having a relatively narrow molecular weight distribution. A high weight average molecular weight, when accompanied by a narrow molecular weight distribution, provides a polyolefin or an ethylene-lower-α-olefin copolymer with high strength properties. Traditional Ziegler-Natta catalyst systems—a transition metal compound cocatalyzed by an aluminum alkyl—are in general capable of producing polyolefins having a high molecular weight but with a broad molecular weight distribution.

More recently a catalyst system has been developed wherein the transition metal compound has two or more cyclopentadienyl ring ligands, such transition metal compound also referred to as a metallocene, which catalyzes the production of olefin monomers to polyolefins. Accordingly, metallocene compounds of the Group IV B metals, particularly, titanocene and zirconocene have been utilized as the transition metal component in such "metallocene" containing catalyst system for the production of polyolefins and ethylene-α-olefin copolymers. When such metallocenes are cocatalyzed with an aluminum alkyl—as is the case with a traditional type Ziegler-Natta catalyst system—the catalytic activity of such metallocene catalyst system is generally too low to be of any commercial interest. It has since become known that such metallocenes may be cocatalyzed with an alumoxane—rather than an aluminum alkyl—to provide a metallocene catalyst system of high activity which catalyzes the production of polyolefins. The zirconium metallocene species, as cocatalyzed or activated with alumoxane are commonly more active than their hafnium or titanium analogues for the general polymerization of ethylene alone or together with an α-olefin comonomer.

A wide variety of Group IV B transition metal compounds of the metallocene type have been named as possible candidates for an alumoxane cocatalyzed catalyst system. Hence, although bis(cyclopentadienyl) Group IV B transition metal compounds have been the most preferred and heavily investigated type metallocenes for use in metallocene/alumoxane catalyst for polyolefin production, suggestions have appeared that mono and tris(cyclopentadienyl) transition metal compounds may also be useful. See, for example, U.S. Pat. Nos. 4,522,982; 4,530,914 and 4,701,431. Such mono(cyclopentadienyl) transition metal compounds as have heretofore been suggested as candidates for a metallocene/alumoxane catalyst are mono(cyclopentadienyl) transition metal trihalides and trialkyls.

More recently International Publication No. WO 87/03887 described the use of a composition comprising a transition metal coordinated to at least one cyclopentadienyl and at least one heteroatom ligand as a metallocene type component for use in a metallocene/alumoxane catalyst system for α-olefin polymerization. The composition is broadly defined as a transition metal, preferably of Group IV B of the Periodic Table which is coordinated with at least one cyclopentadienyl ligand and one to three heteroatom ligands, the balance of the coordination requirement being satisfied with cyclopentadienyl or hydrocarbyl ligands. The metallocene/alumoxane catalyst system described is illustrated solely with reference to transition metal compounds which are bis(cyclopentadienyl) Group IV B transition metal compounds.

SUMMARY OF THE INVENTION

In accordance with the present invention, branched α-olefins are copolymerized with ethylene in the presence of a catalyst system comprising an activated cyclopentadienyl transition metal compound. Quite surprisingly, it has been found that the branched α-olefins have a reactivity ratio with ethylene which is sufficiently low to obtain substantial incorporation when these catalysts are employed, despite the bulky "tail" of the branched α-olefin. As a result, the branched α-olefin is unexpectedly incorporated into the copolymer at a competitive rate with the ethylene, and the composition distribution is substantially uniform and generally random.

The present invention resides, at least in part, in the discovery that branched α-olefins can be polymerized with ethylene using certain monocyclopentadienyl metallocene catalysts to obtain a high molecular weight copolymer with a high proportion of branched α-olefin incorporation, a narrow molecular weight distribution and a relatively random and uniform branched α-olefin comonomer distribution. The present invention also resides, in part, in the discovery that certain of these novel copolymers have very surprising properties, such as, for example, modulus, strain to break, rheological properties, storage and loss moduli, dissipative characteristics, and the like. In particular the preferred copolymers of the present invention exhibit surprising toughness, have suppressed or nonexistent secondary phase transitions in the temperature ranges conventional for ethylene/linear α-olefin copolymers, and have a secondary phase transition temperature and/or magnitude different from such conventional copolymers.

In one aspect, then, the present invention provides a substantially compositionally uniform copolymer of ethylene and preferably from about 0.5 to about 10 mole percent, more preferably from about 1 to about 8, and especially from about 1 to about 5 mole percent, of a branched α-olefin incorporated substantially randomly in the copolymer. The copolymer is generally semicrystalline and has a density of from about 0.85 to about 0.95 g/cm$^3$. The copolymer preferably has a weight average molecular weight from about 30,000 to about 1,000,000 daltons or more, more preferably from about 80,000 to about 500,000 daltons, and a molecular weight distribution substantially between about 2 and about 4. The copolymer has a generally uniform comonomer composition distribution. The present invention also provides useful articles made from the foregoing copolymers, including fibers, films, sheets, coatings and molded articles. In particular, the invention provides fibers, films and other forms of the copolymer wherein the copolymer is axially oriented by physical or mechanical processing such as, for example, drawing, extrusion, and the like.

In a further aspect, the present invention provides a method of preparing a copolymer by contacting ethylene and the branched α-olefin comonomer with a catalyst at polymerization conditions wherein the ethylene:comonomer reactivity ratio is less than about 75. In a preferred embodiment, the foregoing copolymers are prepared by contacting ethylene and a branched α-olefin with a catalyst system comprising a Group IV B transition metal component and an activating component for the catalyst at polymerization conditions, and recovering a high molecular weight, narrow molecular weight distribution copolymer having a generally uniform, random α-olefin composition distribution. The "Group IV B transition metal component" of the catalyst system is represented by the general formula:

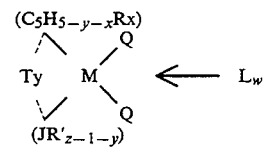

wherein:

M is Zr, Hf or Ti and is in its highest formal oxidation state (+4, d$^0$ complex);

$(C_5H_{5-y-x}R_x)$ is a cyclopentadienyl ring which is substituted with from zero to five substituent groups R, "x" is 0, 1, 2, 3, 4 or 5 denoting the degree of substitution, and each substituent group R is, independently, a radical selected from a group consisting of $C_1$–$C_{20}$ hydrocarbyl radicals, substituted $C_1$–$C_{20}$ hydrocarbyl radicals wherein one or more hydrogen atoms is replaced by a halogen radical, an amido radical, a phosphido radical, an alkoxy radical, an alkylborido radical, or any other radical containing a Lewis acidic or basic functionality, $C_1$–$C_{20}$ hydrocarbyl-substituted metalloid radicals wherein the metalloid is selected from the Group IV A of the Periodic Table of Elements, and halogen radicals, amido radicals, phosphido radicals, alkoxy radicals, alkylborido radicals or any other radical containing Lewis acidic or basic functionality or $(C_5H_{5-y-x}R_x)$ is a cyclopentadienyl ring in which two adjacent R-groups are joined forming a $C_4$–$C_{20}$ ring to give a saturated or unsaturated polycyclic cyclopentadienyl ligand such as indenyl, tetrahydroindenyl, fluorenyl or octahydrofluorenyl;

$(JR'_{z-1-y})$ is a heteroatom ligand in which J is an element with a coordination number of three from Group V A or an element with a coordination number of two from Group VIA of the Periodic Table of Elements, preferably nitrogen, phosphorus, oxygen or sulfur, and each R' is, independently, a radical selected from the group consisting of $C_1$–$C_{20}$ hydrocarbyl radicals, substituted $C_1$–$C_{20}$ hydrocarbyl radicals wherein one or more hydrogen atoms is replaced by a halogen radical, an amido radical, a phosphido radical, an alkoxy radical, an alkylborido radical or any other radical containing a Lewis acidic or basic functionality and "z" is the coordination number of the element J;

Each Q may be independently any univalent anionic ligand such as halogen, hydride, or substituted or unsubstituted $C_1$–$C_{20}$ hydrocarbyl, alkoxide, aryloxide, amide, arylamide, phosphide or arylphosphide, provided that where any Q is a hydrocarbyl such Q is different from ($C_5H_{5-y-x}R_x$) or both Q together may be an alkylidene or a cyclometallated hydrocarbyl or any other divalent anionic chelating ligand;

"y" is 0 or 1 when w is greater than 0; y is 1 when w is 0; when "y" is 1, T is a covalent bridging group containing a Group IV A or V A element such as, but not limited to, a dialkyl, alkylaryl or diaryl silicon or germanium radical, alkyl or aryl phosphine or amine radical, or a hydrocarbyl radical such as methylene, ethylene and the like;

L is a Lewis base such as diethylether, tetraethylammonium chloride, tetrahydrofuran, dimethylaniline, aniline, trimethylphosphine, n-butylamine, and the like; and "w" is a number from 0 to 3; L can also be a second transition metal compound of the same type such that the two metal centers M and M' are bridged by Q and Q', wherein M' has the same meaning as M and Q' has the same meaning as Q. Such compounds are represented by the formula:

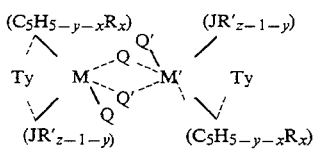

The activating component for the metallocene catalyst component can be an alumoxane component represented by the formulas: $(R^3-Al-O)_m$; $R^4(R^5-Al-O)_m-AlR^6_2$ or mixtures thereof, wherein $R^3-R^6$ are, independently, a univalent anionic ligand such as a $C_1-C_5$ alkyl group or halide and "m" is an integer ranging from 1 to about 50 and preferably is from about 13 to about 25. Alternatively, the activating component for the metallocene catalyst component can comprise a cation capable of irreversibly reacting with a substituent of the metallocene component and a bulky, non-coordinating anion capable of stabilizing the metal cation formed by the reaction between the irreversibly-reacting cation and the metallocene component substituent.

DETAILED DESCRIPTION OF THE INVENTION

Figure 1:
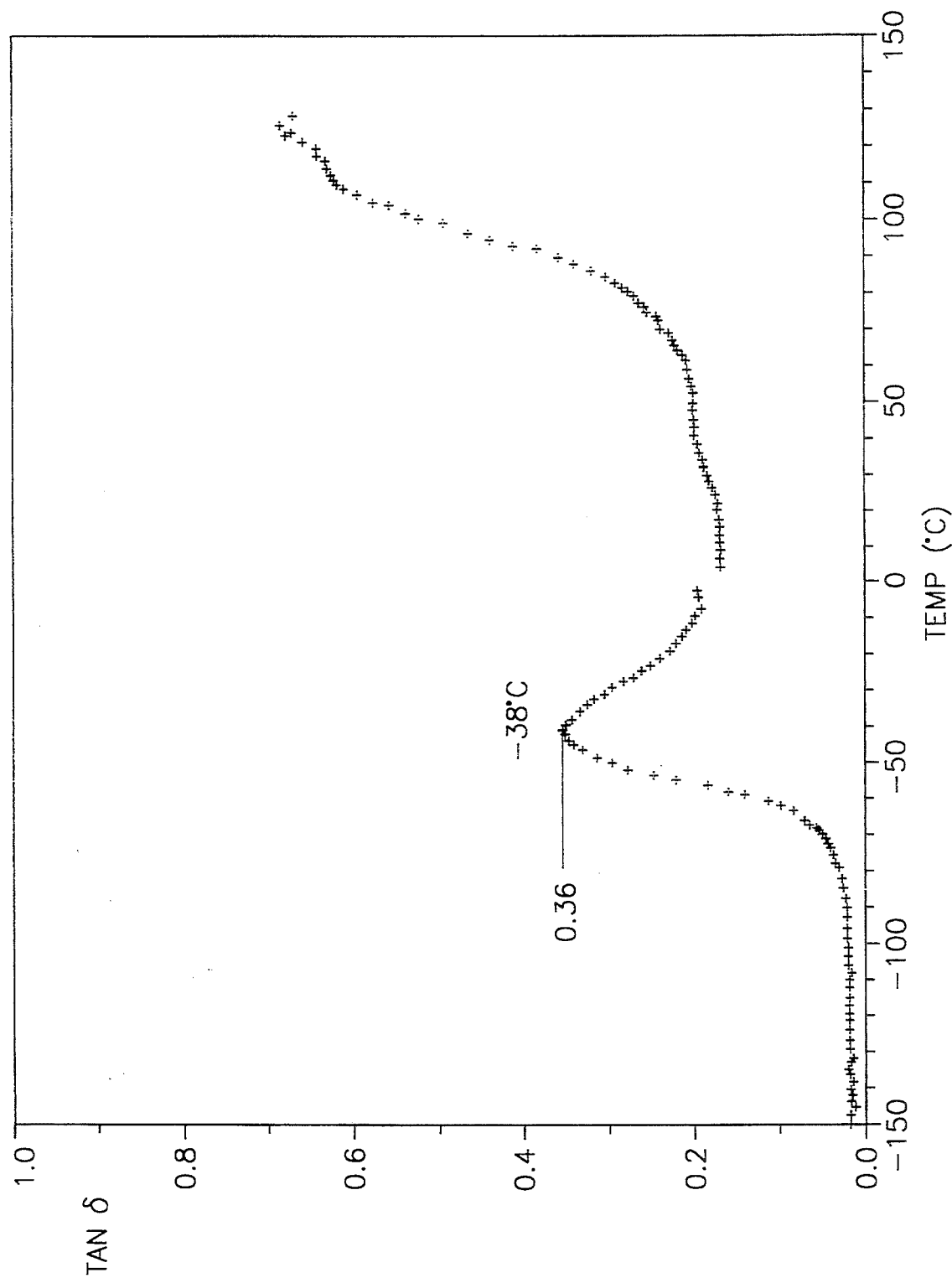
FIG. 1 is a plot of tan δ(loss modulus (E")/storage modulus (E'), 1 Hz, 10% torsion strain) versus temperature for the ethylene/5-ethyl-nonene-1 copolymer of Example 6.
Figure 2:
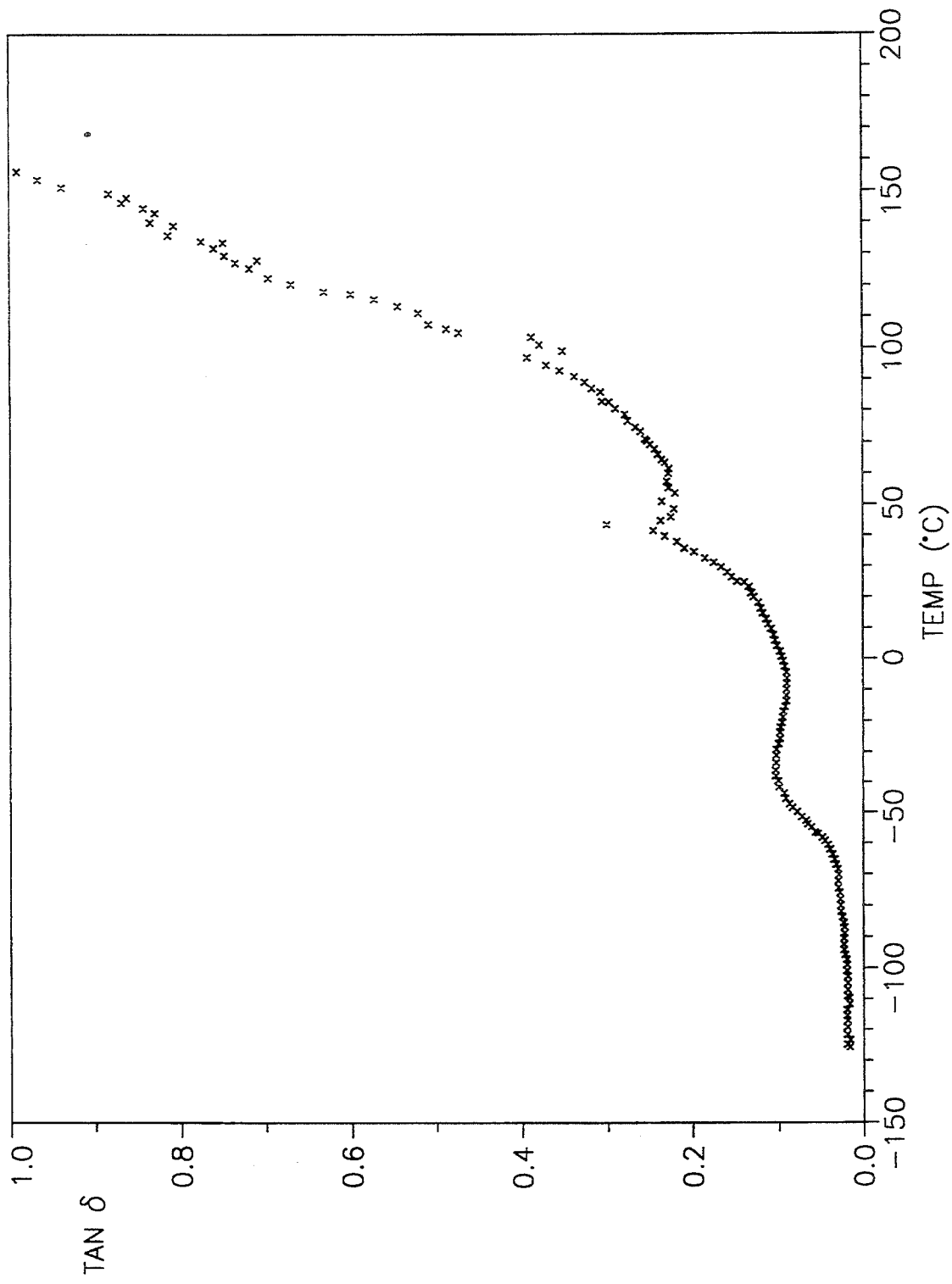
FIG. 2 is a plot of tan δ(1 Hz, 10% torsion strain) versus temperature for the ethylene/5-ethyl-nonene-1 copolymer of Example 5.
Figure 3:
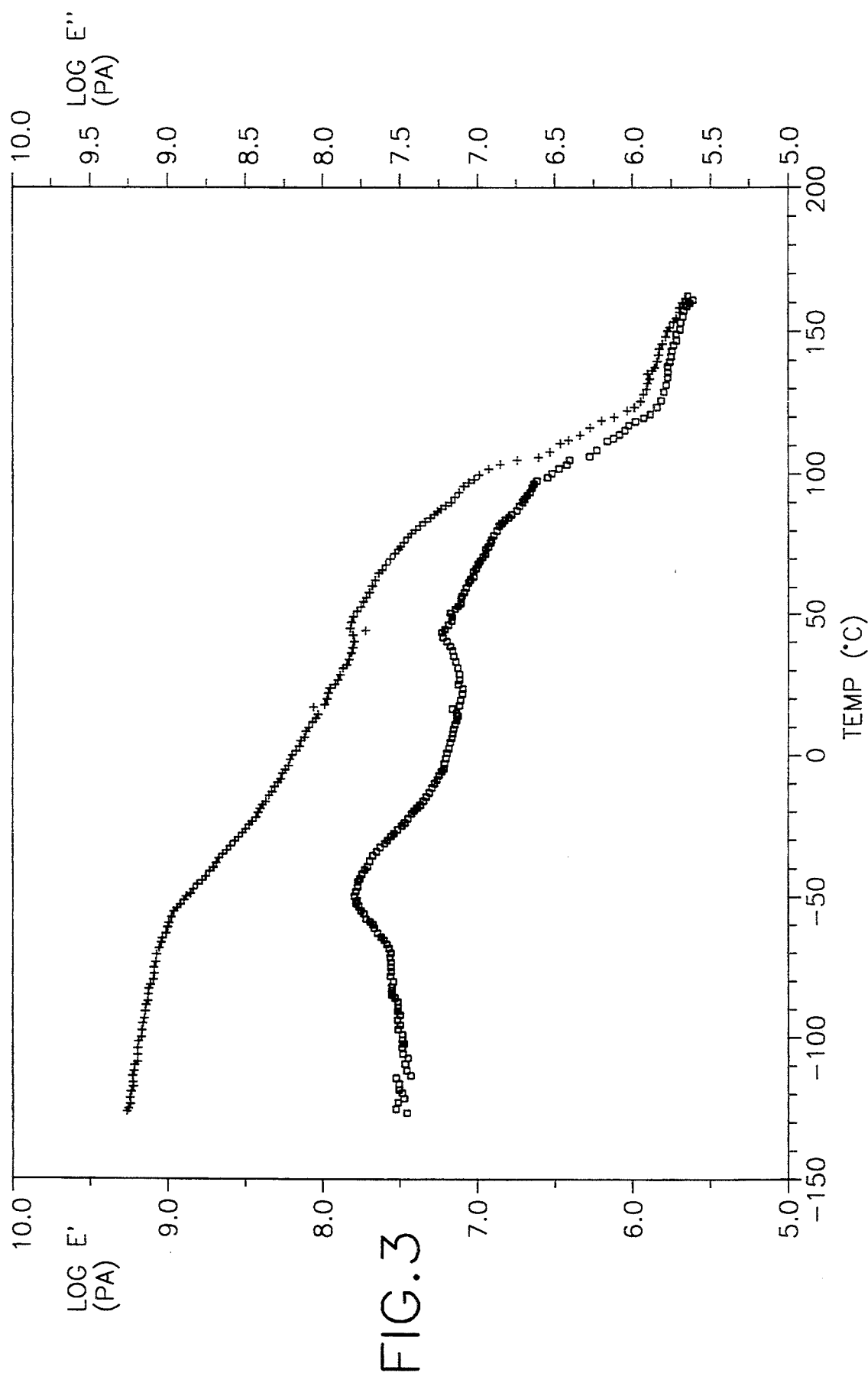
FIG. 3 is a plot of log (storage modulus E') (+-+-+) and log (loss modulus E") (O-O-O) (1 Hz, 10% torsion strain) versus temperature for the ethylene/5-ethylnonene-1 copolymer of Example 5.
Figure 4:
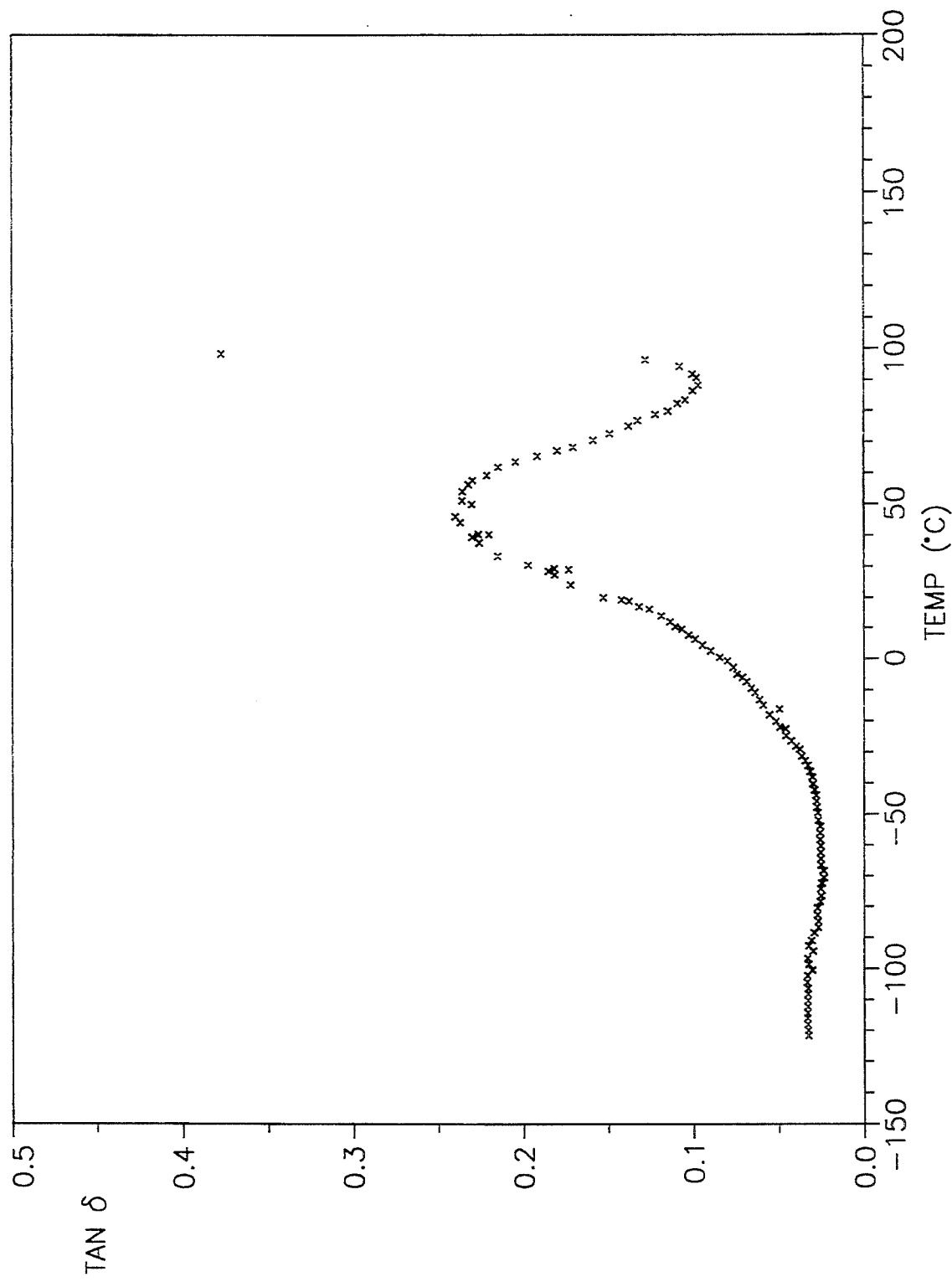
FIG. 4 is a plot of tan δ(1 Hz, 10% torsion strain) versus temperature for the ethylene/3-methylpentene-1 copolymer of Example 7.
Figure 5:
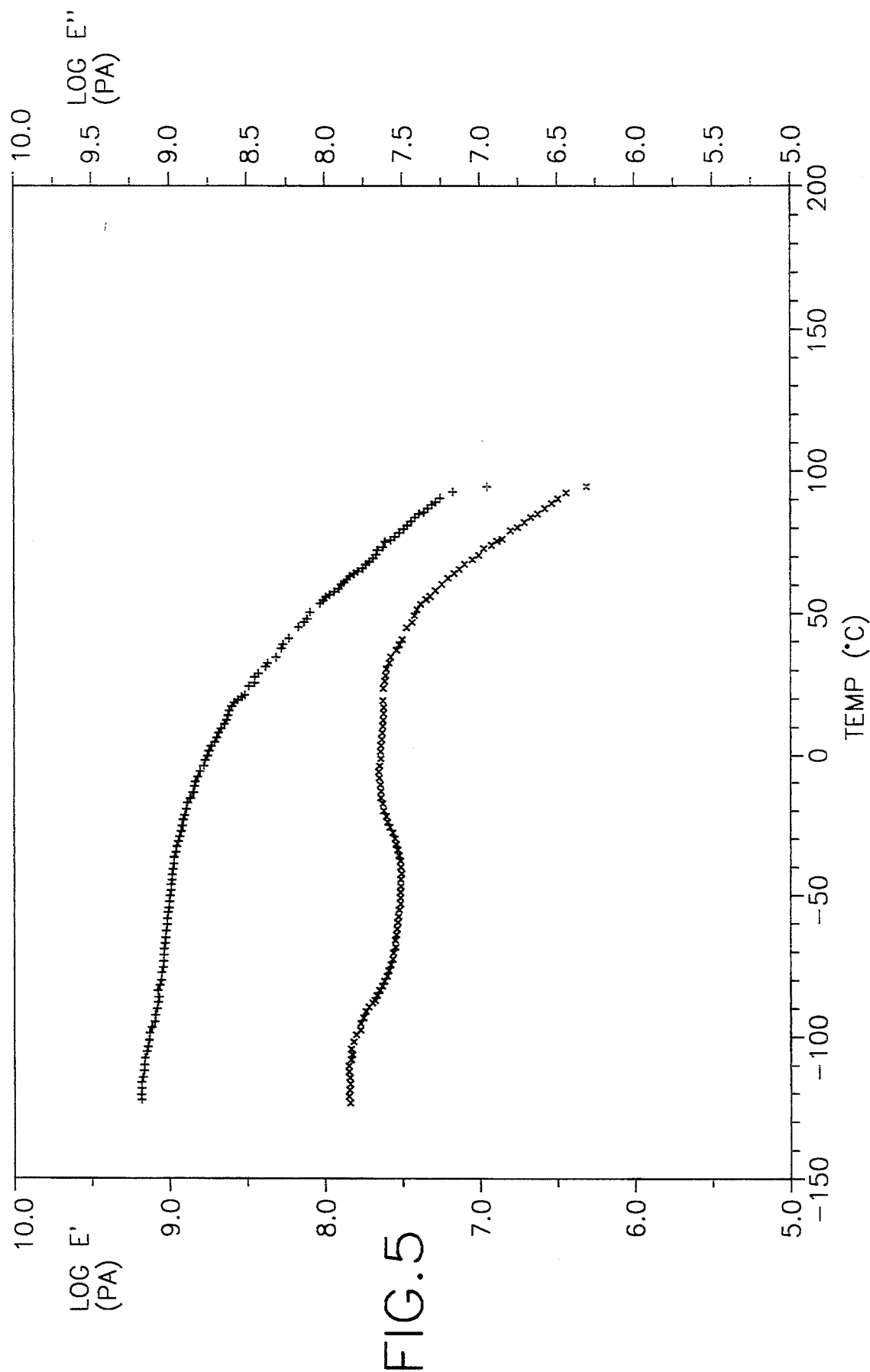
FIG. 5 is a plot of log (storage modulus E') (+-+-+) and log (loss modulus E") (x-x-x) (10 Hz, 10% torsion strain) versus temperature for the ethylene/3-methylpentene-1 copolymer of Example 7.
Figure 6:
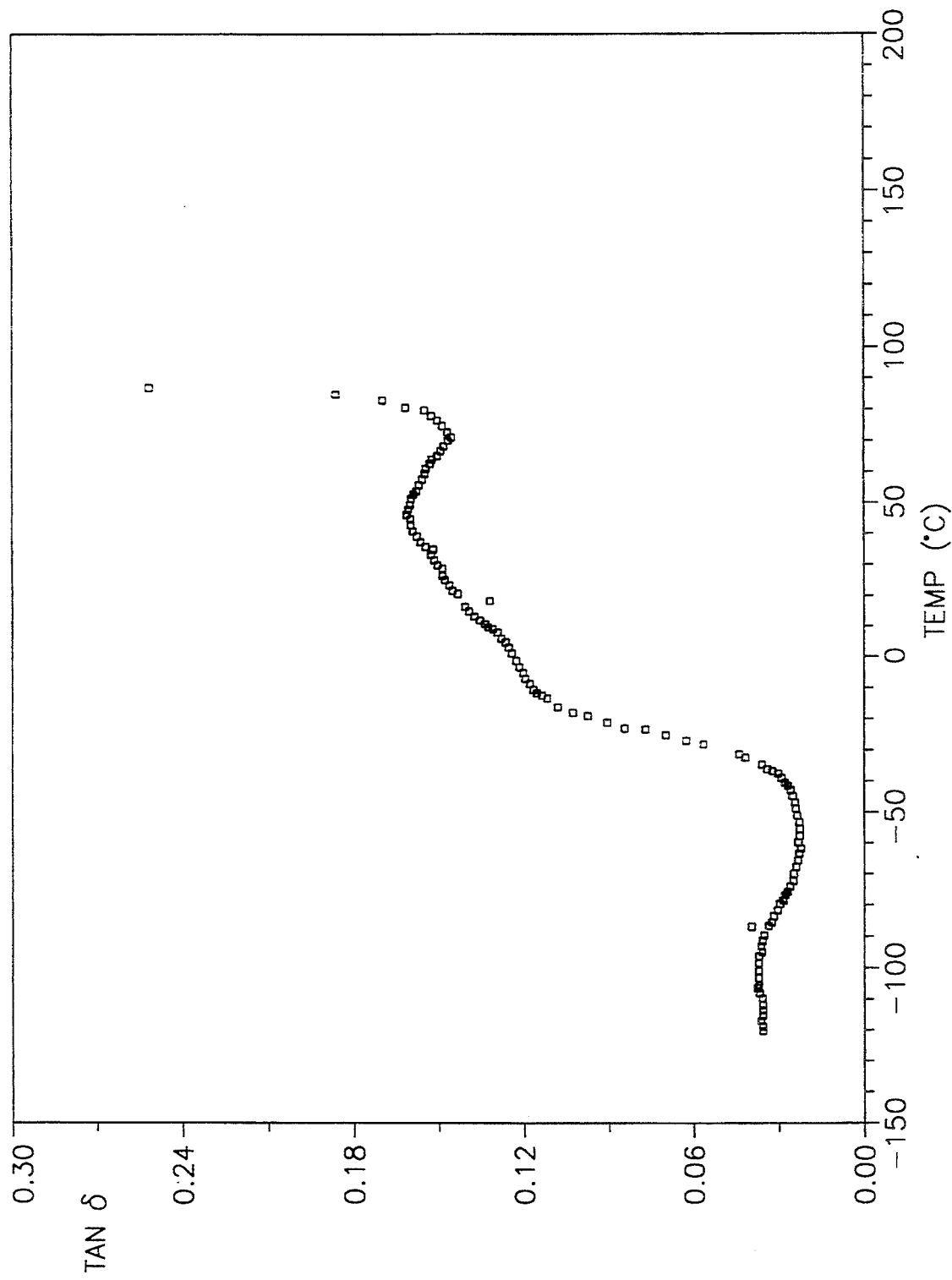
FIG. 6 is a plot of tan δ(10 Hz, 10% torsion strain) versus temperature for the ethylene/3methylpentene copolymer of Example 8.
Figure 7:
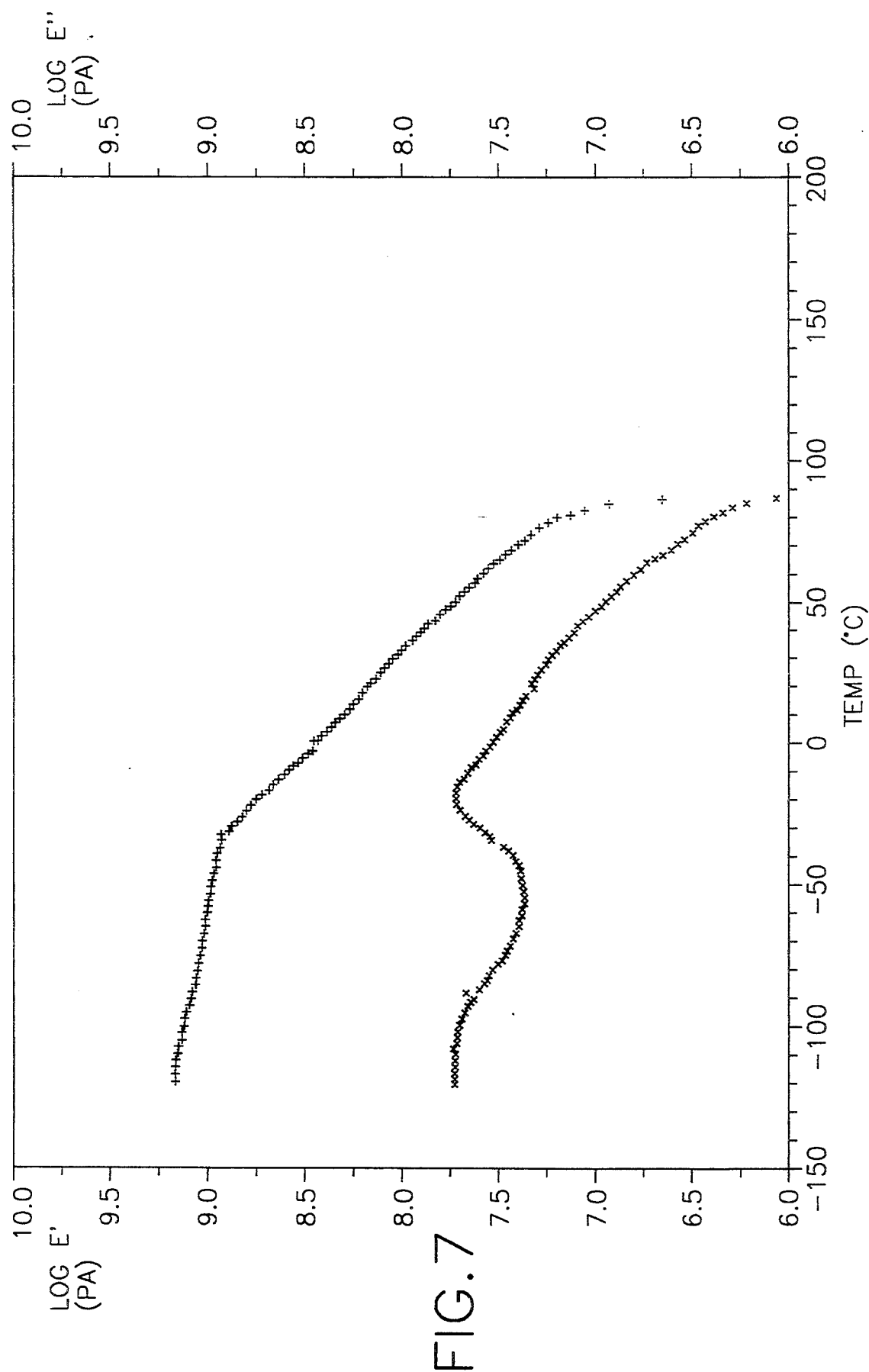
FIG. 7 is a plot of log (storage modulus E') (+-+-+) and log (loss modulus E") (x-x-x) (10 Hz, 10% torsion strain) versus temperature for the ethylene/3-methylpentene-1 copolymer of Example 8.
Figure 8:
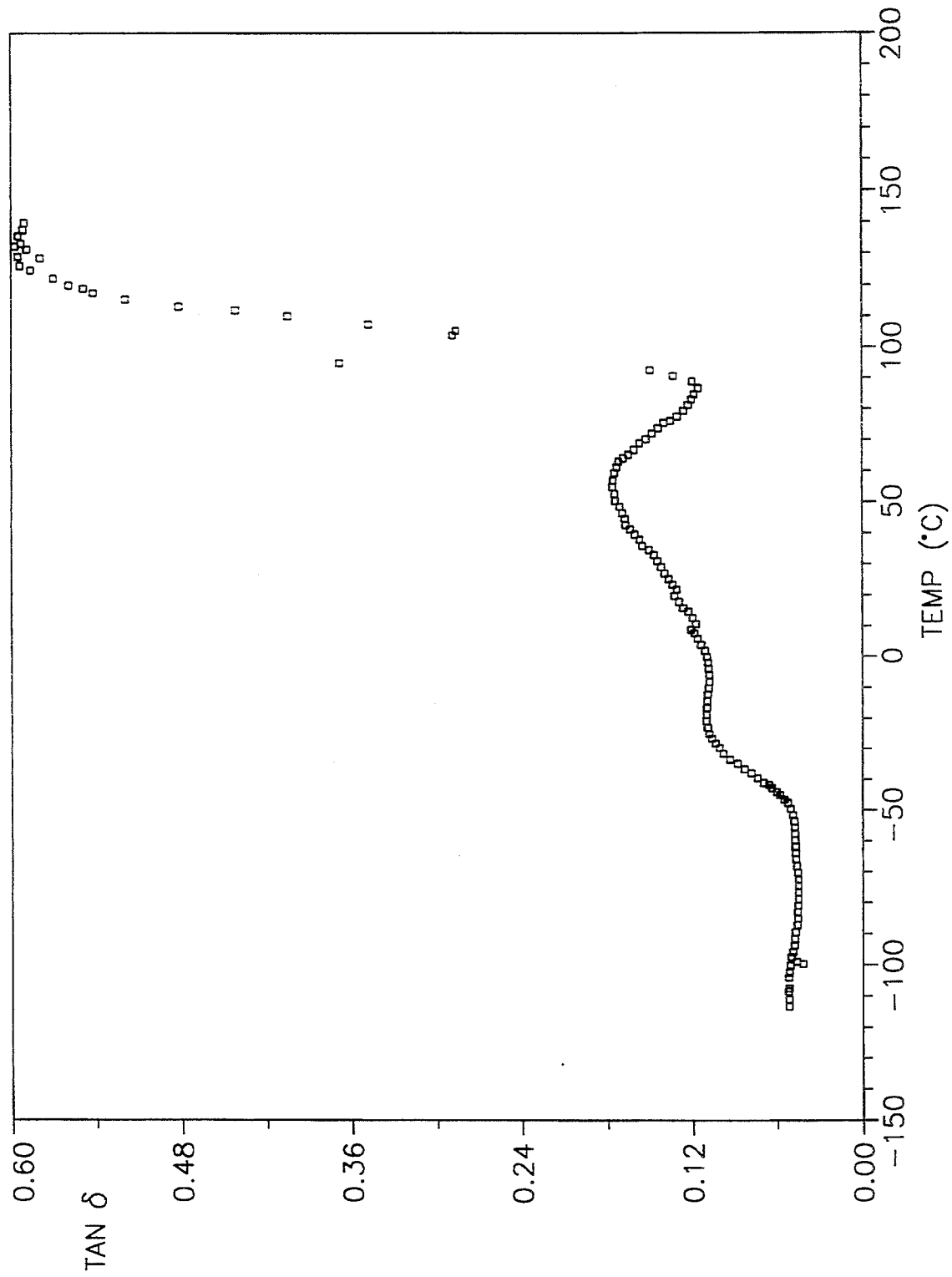
FIG. 8 is a plot of tan δ(10 Hz, 10% strain) versus temperature for the ethylene/5-ethylnonene-1 copolymer of Example 4.
Figure 9:
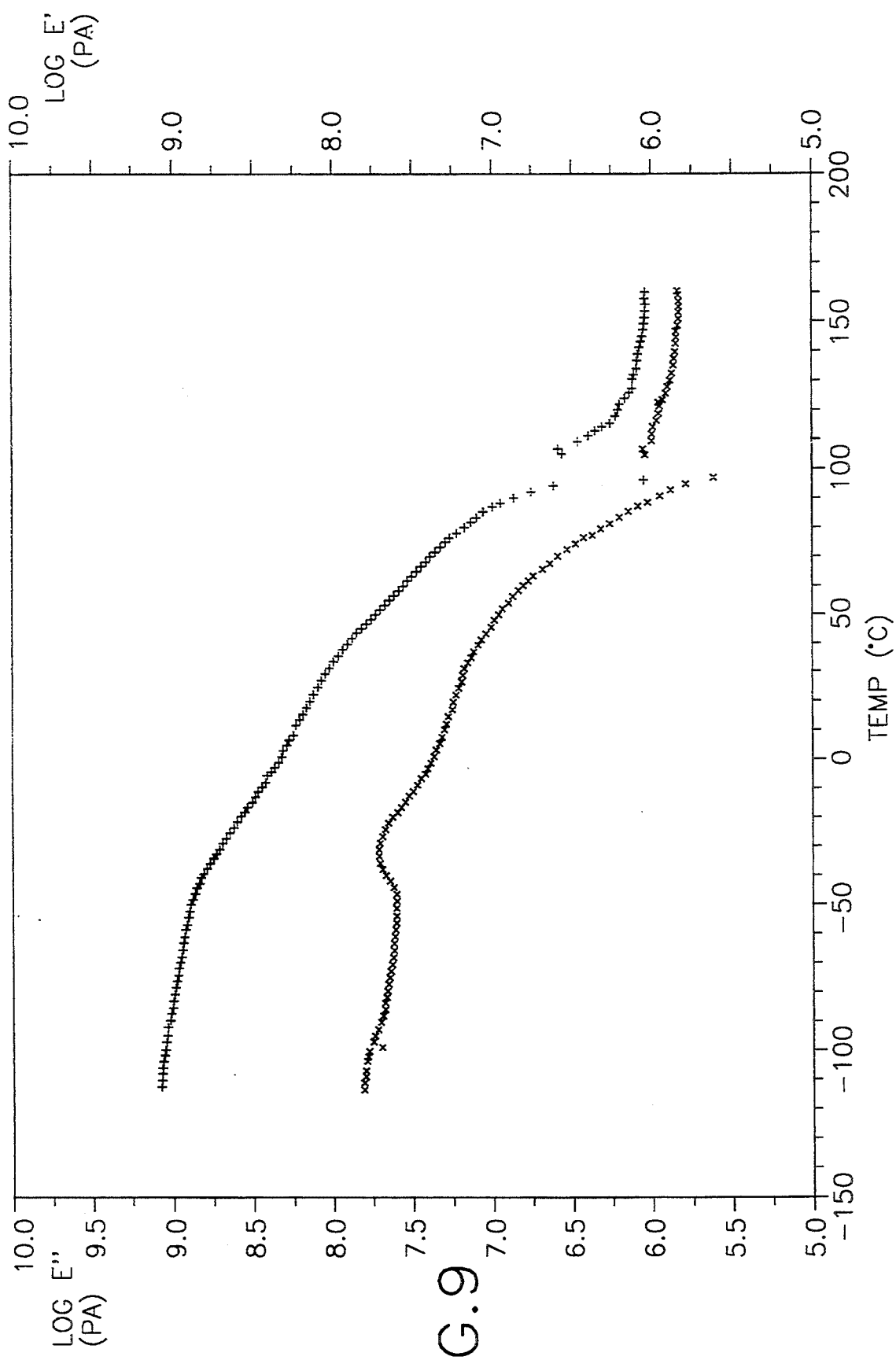
FIG. 9 is a plot of log (storage modulus E') (+-+-+) and log (loss modulus E") (x-x-x) (10 Hz, 10% torsion strain) versus temperature for the ethylene/5-ethylnonene-1 copolymer of Example 4.

The present invention relates to copolymers of ethylene with branched α-olefins. The branched α-olefin comonomer is generally not copolymerizable at a competitive rate with ethylene when conventional Ziegler-Natta catalysts are used. The branched α-olefin generally has at least one alkyl branch adjacent to the ethylenic unsaturation of the comonomer, and thus, when copolymerized with ethylene, forms a copolymer having a backbone or main chain and pendant side chains randomly interspersed along the backbone, with alkyl branches on the side chain adjacent the backbone. The alkyl branches on the side chains are preferably closer to the polymer backbone than the terminal carbon in the side chain, or stated another way, the alkyl branch on the comonomer is preferably closer to the ethylenic unsaturation than the terminal carbon of the longest straight chain of the comonomer. The comonomer contains at least one alkyl branch, and more preferably has from 2 to 4 alkyl branches along the longest straight chain. Preferred branches have from 1 to 3 carbon atoms each, such as methyl, ethyl, propyl and isopropyl. The branched α-olefin comonomer must have at least 5 carbon atoms, more preferably has at least 6 carbon atoms, and most preferably has at least 8 carbon atoms. The branched comonomer is not, in general, restricted at any particular upper limit of size and $C_{100}$ or larger could be used, although as a practical matter, the branched comonomer preferably contains less than about 30 carbon atoms, more preferably up to about 14, and especially up to about 12 carbon atoms.

In accordance with a preferred embodiment, the branched α-olefin comonomer has the formula:

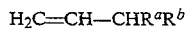

wherein $R^a$ is $C_{1-3}$ alkyl and $R^b$ is $C_{2+}$ aliphatic hydrocarbyl, and wherein the branched α-olefin has up to about 30 carbon atoms, preferably 6 to 14 carbon atoms and more preferably 8 to 12 carbon atoms.

Specific representative examples of suitable branched α-olefins include 3-methylpentene-1, 3-ethylpentene-1, 3,4-dimethylpentene-1, 4-methyl-3-ethylpentene-1, 3,4,4-trimethylpentene-1, 4,4-dimethyl-3-ethylpentene- 1, 3-methylhexene-1, 3-ethylhexene-1, 3-propylhexene-1, 3-isopropylhexene-1, 3,4-dimethylhexene-1, 3,5-dimethylhexene-1, 4-methyl-3-ethylhexene-1, 5-methyl-3-ethylhexene-1, 3-methyl-4-ethylhexene-1, 4-methyl-3-propylhexene-1, 5-methyl-3-propylhexene-1, 3,4-diethylhexene-1, 4-methyl-3-isopropylhexene-1, 5-methyl-3-isopropylhexene-1, 3,4,4-trimethylhexene-1, 3,4,5-trimethylhexene-1, 3,5,5-trimethylhexene-1, 4,4-dimethyl-3-ethylhexene-1, 4,5-dimethyl-3-ethylhexene-1, 5,5-dimethyl-3-ethylhexene-1, 5,5-dimethyl-3-ethylhexene-1, 3,4-dimethyl-4-ethylhexene-1, 3,5-dimethyl-4-ethylhexene-1, 4-methyl-3,4-diethylhexene-1, 5-methyl-3,4-diethylhexene-1, 3-methyl-4,4-diethylhexene-1, 3,4,4-triethylhexene-1, 4,4-dimethyl-3-propylhexene-1, 4,5-dimethyl-3-propylhexene-1, 5,5-dimethyl-3-propylhexene-1, 4,4-dimethyl-3-isopropylhexene-1, 4,5-dimethyl-3-isopropylhexene-1, 5,5-dimethyl-3-isopropylhexene-1, 3,4,4,5-tetramethylhexene-1, 3,4,5,5-tetramethylhexene-1, 4,4,5-trimethyl-3-ethylhexene-1, 4,5,5-trimethyl-3-ethylhexene-1, 3,4,5-trimethyl-4-ethylhexene-1, 3,5,5-trimethyl-4-ethylhexene-1, 4,5-dimethyl-3,4-diethylhexene-1, 5,5-dimethyl-3,4-diethylhexene-1, 3,5-dimethyl-4,4-diethylhexene-1, 5-methyl-3,4,4-triethylhexene-1, 5-ethylnonene-1 and the like.

The copolymer can further contain additional monomers, usually in relatively minor amounts, which do not substantially adversely affect the novel properties of the copolymers. Such termonomers include vinyl and vinylidene compounds, for example, generally linear α-olefins having from 3 to 100 carbon atoms, preferably from 3 to 20 carbon atoms, and particularly from 3 to 10 carbon atoms, such as propylene, 1-butene, isobutene, 1-pentene, 4-methylpentene-1, 1-hexene, 1-heptene, 1-octene, 1-nonene, and the like; dienes, such as 1,3-butadiene, 2-methyl-1,4-pentadiene, 1,4-hexadiene, 1,5-hexadiene and the like; vinyl aromatic and alicyclic monomers, such as styrene, alkyl-substituted styrene, cyclopentene, vinyl cyclohexane, vinyl cyclohexene phenyl butadiene, vinyl norbornene, and the like; and combinations thereof. Specifically contemplated are terpolymers of ethylene, the branched α-olefin and from about 2 to about 25 mole percent, preferably 2 to 10 mole percent, of a linear $C_3$ to $C_8$ α-olefin.

Preferably, the ethylene is interpolymerized with from about 0.5 to about 10 mole percent of the branched α-olefin, more preferably from about 1 to about 8 mole percent branched α-olefin, and especially from about 1 to about 5 mole percent branched α-olefin. In general, at an increased branched α-olefin content, the properties imparted by the branched α-olefin are more pronounced, e.g., toughness and strain hardening increase.

The polymers of the present invention are generally semicrystalline, but can be amorphous if more than about 12 mole percent of a linear $C_3$–$C_8$ α-olefin termonomer is incorporated. The ethylene/branched α-olefin copolymers generally have a density from about 0.85 to about 0.95 g/cm$^3$.

The polymers of the present invention have a surprisingly high molecular weight, preferably from about 30,000 to about 1,000,000 daltons or more, depending on the desired end-use application. As used herein, molecular weight refers to the weight average molecular weight ($M_w$), unless otherwise indicated. The unique characteristics of the ethylene/branched α-olefin copolymers are not generally observed at lower molecular weights where there is limited chain entanglement. Polymers having a molecular weight higher than this range, while theoretically possible, are difficult to prepare as a practical matter. Most commercially useful polymers, e.g. in film, fiber and molding applications, have $M_w$ in the range of from about 80,000 to about 500,000 daltons.

The copolymers of the present invention have a narrow molecular weight distribution (MWD). This surprising fact is reflected in a low polydispersity, i.e. a ratio of $M_w$ to number average molecular weight ($M_n$). The MWD ($M_w/M_n$) is generally in the range of from about 2 to about 4, even in the copolymers of very high molecular weight.

The copolymers of the present invention are substantially random and quite surprisingly should have a fairly uniform branched α-olefin distribution throughout the copolymer. This uniform composition can be reflected in a relatively high composition distribution breadth index (CDBI). As used herein, CDBI is defined as the percentage by weight of the copolymer molecules having a branched α-olefin comonomer content within 50 percent of the median molar comonomer content, i.e. ±50 percent of the median $C_{10}$–$C_{100}$ olefin content. Homopolymers such as polyethylene, which do not contain a comonomer, thus have a CDBI of 100%. The CDBI of a copolymer is readily calculated from data obtained by techniques known in the art, such as, for example, temperature rising elution fractionation (TREF) as described in U.S. Ser. No. 151,350 or Wild et al., *J. Poly. Sci, Poly. Phys. Ed.*, vol. 20, p. 441 (1982). The ethylene/branched α-olefin copolymers herein generally should preferably have a CDBI on the order of about 50 percent or more, i.e. about 50 percent or more of the copolymer having a molar branched α-olefin comonomer content within 50 percent of the median comonomer content. In contrast, linear low density polyethylene prepared using conventional Ziegler-Natta catalyst has a CDBI on the order of 30 to 40 percent.

The present polymers comprise linear, comb-like molecules, wherein each of the side chains are of short, controlled branching which reflects the configuration of the branched α-olefin comonomer, as opposed to uncontrolled long chain branched polymers which are generally obtained by free-radically initiated, high pressure ethylene polymerization conventionally used to obtain low density polyethylene (LDPE). This derives from the use of a single-site coordination catalyst as opposed to a free radical catalyst. The olefin polymerizes in a predominantly head-to-tail fashion so that the polymer molecule has a generally linear main chain formed by polymerization at the carbon-carbon double bond, and a plurality of side chains of controlled length and branching corresponding to the aliphatic "tails" of the branched α-olefin.

The branched side chains in the present copolymers can have a profound effect on the crystalline behavior of the copolymers. For example, linear low density polyethylenes invariably have secondary phase transitions at from about $-120°$ C. to about $-90°$ C. (generally known as $T_\gamma$) and at from about $-30°$ C. to about $20°$ C. (generally known as $T_\beta$). In semicrystalline LLDPE, these $T_\beta$ and $T_\gamma$ phenomena appear to be relatively unaffected, or only slightly affected, by the size of the $C_3$–$C_8$ linear α-olefin comonomer, as well as comonomer content. However, in the case of the present copolymers where the side chains are branched adjacent the generally linear polymer the $T_\beta$ and $T_\gamma$ are at least highly suppressed, and usually entirely eliminated, at the conventional LLDPE temperatures at which they are normally observed. Instead, a secondary phase transition temperature (which could be an altered or shifted $T_\beta$ and/or $T_\gamma$ owing to the branching of the side chains) appears outside the conventional ranges. For example, in a copolymer containing a 3-methyl branched α-olefin such as 3,5,5-trimethylhexene-1, the $T_\gamma$ disappears completely, the copolymer is essentially free of any phase transition at −30° C. to 20° C., and a secondary phase transition temperature is seen at about 70°–80° C. This copolymer is also observed to exhibit very high toughness and profound strain hardening. As the position of the branch is moved away from the backbone, say to the 5-position as in, for example, 5-ethylnonene copolymers, the $T_\beta$ can be observed somewhat, although significantly suppressed, $T_\beta$ is still not apparent in the −30° C. to 20° C. range, and a secondary phase transition is observed at about −35° C. to about −40° C. Also, the toughness is decreased and strain hardening much less pronounced than with the 3,5,5-trimethylhexene-1 copolymers.

The novel characteristics of the ethylene/branched α-olefin copolymers of the present invention, i.e. simultaneously high branched α-olefin content, high $M_w$, narrow MWD and a relatively good degree of random comonomer incorporation, impart a number of unique and, in some cases, rather surprising physical, rheological and other properties to the copolymers. As a consequence, the copolymers have a wide number of uses, particularly where high toughness is desirable.

For structural film applications, the generally semicrystalline copolymers preferably have a density from about 0.88 to about 0.93 g/cm$^3$. The present films have high strength and a high Young's modulus, but have exceptionally high toughness (generally taken as the integrated area under the stress-strain curve) at increasing strain or elongation, and excellent processability due to rheological properties.

The copolymer can be used in a monolayer film, e.g., a film comprised of a single layer of the copolymer without adjacent layers made of a different polymer. Alternatively, the copolymer can be used as one or more layers in a multi-layer film, e.g. as a structural and/or skin layer.

The film can include one or more conventional additives, e.g. antiblock (slip and/or antiblock) additives which may be added during the production of the copolymer or subsequently blended in. Such additives are well-known in the art and include, for example, silicas, silicates, diatomaceous earths, talcs and various lubricants. These additives are preferably utilized in amounts ranging from about 100 ppm to about 20,000 ppm, more preferably between about 500 ppm to about 10,000 ppm by weight based upon the weight of the copolymer. The copolymer can, if desired, also include one or more other well-known additives such as, for example, tackifiers, oils, viscosity modifiers, waxes, antioxidants, ultraviolet absorbers, antistatic agents, release agents, pigments, colorants, crosslinking agents, coupling agents, fillers, or the like; however, this again should not be considered a limitation of the present invention.

The film is produced from the ethylene copolymer by any one of a number of well-known extrusion or coextrusion techniques. As preferred examples, any of the blown or chill roll cast processes known in the art, with or without axial or biaxial orientation obtained by mechanically working the film, as by stretching, drawing, extrusion or the like, can be used.

As previously mentioned, the semicrystalline films of the present invention have properties making them especially well suited for use in a variety of applications. For example, these films can be used in stretch/cling films or made into other forms, such as a tape, by any one of a number of well-known cutting, slitting and/or rewinding operations. Physical properties including, but not limited to, tensile strength, tear strength and elongation can be adjusted over wide ranges by altering the copolymer properties and specifications, as well as additive packages, as appropriate to meet the requirements to a given structural, wrapping, bundling, taping or other application.

The copolymer of the present invention can also be blended with another polymer such as LLDPE, LDPE, HDPE, polypropylene or the like to improve the properties of the blend polymer. The copolymer of the present invention can, for example, be blended with another polymer to enhance the toughness of the blend polymer. The improvement in toughness generally depends on the toughness of the ethylene/branched α-olefin copolymer and the relative properties of the blend polymer, and can be balanced against the other properties of the blend.

The copolymer of the present invention is also contemplated to be used in fibers, particularly to make high tenacity fibers. It is contemplated that the copolymer can be formed into fiber using conventional fiber formation equipment, such as, for example, equipment commonly employed for melt spinning or to form melt blown fiber, or the like. In melt spinning, either monofilaments or fine denier fibers, a relatively high melt strength is generally required, and the copolymer preferably has a melt index (MI) of from about 10 to about 100 dg/min. (As used herein, MI is determined in accordance with ASTM D-1238, condition E (190° C./2.16 kg)). Typical melt spinning equipment includes a mixing extruder which feeds a spinning pump which supplies polymer to mechanical filters and a spinnerette with a plurality of extrusion holes therein. The filament or filaments formed from the spinnerette are taken up on a take up roll after the polyolefin has solidified to form fibers. If desired, the fiber may be subjected to further drawing or stretching, either heated or cold, and also to texturizing, such as, for example, air jet texturing, steam jet texturing, stuffing box treatment, cutting or crimping into staples, and the like.

In the case of melt blown fiber, the copolymer is generally fed to an extrusion die along with a high pressure source of air or other inert gas in such a fashion as to cause the melt to fragment at the die orifice and to be drawn by the passage of the air into short fiber which solidifies before it is deposited and taken up as a mat or web on a screen or roll which may be optionally heated. Melt blown fiber formation generally requires low melt viscosity material, and for this reason, it is desirable to use a copolymer in melt blown fiber formation which has a MI in the range from about 400 to about 1000 dg/min.

In a preferred embodiment, the copolymer of the present invention can be used to form nonwoven fabric. The fiber can be bonded using conventional techniques, such as, for example, needle punch, adhesive binder, binder fibers, hot embossed roll calendaring and the like.

It is also contemplated that the copolymer of the present invention can be used as one component of a biconstituent or bicomponent fiber wherein the fiber includes a second component in a side-by-side or sheath-core configuration. For example, the copolymer and LLDPE, LDPE, HDPE, polypropylene, polyethylene terephthalate (PET) or the like can be formed into a side-by-side or sheath-core bicomponent fiber by using equipment and techniques known for formation of bicomponent fibers. Alternatively, the copolymer of the present invention can be used as the dispersed or matrix phase in a biconstituent fiber.

The copolymer of the present invention has a wide number of uses because of its unique properties which can be varied to suit particular applications. The copolymer can have utility, for example, in film, fiber and molding applications, as previously mentioned; in applications requiring super tough polymers with the unique morphology of the present copolymer; in film surface modifications wherein the copolymer is added to or coated on, e.g. a conventional polyethylene, and the film surface can also be subjected to corona discharge or other surface treatment; in polymer processing as an additive to enhance the melt viscosity of the thermoplastic, elastomer or thermoplastic elastomer being processed; in elastomer applications, particularly vulcanizable elastomers wherein the copolymer includes a termonomer which imparts vulcanizability; in applications requiring a tough polymer; in laminates and coating applications as a hydrophobic, corrosion-resistant coating; in curable coatings, where the copolymer includes a termonomer which imparts vulcanizability through residual unsaturation (e.g. a diene termonomer), which are crosslinkable by the action of an acrylate crosslinking agent (e.g. 2-ethyl-2-hydroxymethyl-1,3-propanediol trimethacrylate), a silane coupling agent, irradiation (e.g. electron beam or gamma rays), or the like; in various molding applications, e.g. injection molding, rotational molding, blow molding and thermoforming; and the like.

CATALYST COMPONENT

The present invention relates to copolymers of ethylene and branched α-olefins made by a process comprising polymerizing branched α-olefins with ethylene in the presence of a catalyst providing a low ethylene:-comonomer reactivity ratio, preferably a ratio less than about 75, more preferably less than about 50, and especially from about 25 to about 50. A preferred catalyst comprises an activated cyclopentadienyl-transition metal compound wherein the transition metal component is from Group IV B.

The Group IV B transition metal component of the catalyst system is represented by the general formula:

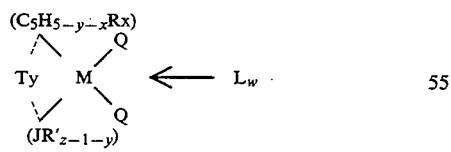

wherein:

M is Zr, Hf or Ti and is in its highest formal oxidation state ($+4$, $d^0$ complex);

$(C_5H_{5-y-x}R_x)$ is a cyclopentadienyl ring which is substituted with from zero to five substituent groups R, "x" is 0, 1, 2, 3, 4 or 5 denoting the degree of substitution, and each substituent group R is, independently, a radical selected from a group consisting of $C_1$–$C_{20}$ hydrocarbyl radicals, substituted $C_1$–$C_{20}$ hydrocarbyl radicals wherein one or more hydrogen atoms is replaced by a halogen radical, an amido radical, a phosphido radical, an alkoxy radical or any other radical containing a Lewis acidic or basic functionality, $C_1$–$C_{20}$ hydrocarbyl-substituted metalloid radicals wherein the metalloid is selected from the Group IV A of the Periodic Table of Elements, and halogen radicals, amido radicals, phosphido radicals, alkoxy radicals, alkylborido radicals or any other radical containing a Lewis acidic or basic functionality or $(C_5H_{5-y-x}R_x)$ is a cyclopentadienyl ring in which two adjacent R-groups are joined forming $C_4$–$C_{20}$ ring to give a saturated or unsaturated polycyclic cyclopentadienyl ligand such as indenyl, tetrahydroindenyl, fluorenyl or octahydrofluorenyl;

$(JR'_{z-1-y})$ is a heteroatom ligand in which J is an element with a coordination number of three from Group V A or an element with a coordination number of two from Group VIA of the Periodic Table of Elements, preferably nitrogen, phosphorus, oxygen or sulfur with nitrogen being preferred, and each R' is, independently a radical selected from a group consisting of $C_1$–$C_{20}$ hydrocarbyl radicals, substituted $C_1$–$C_{20}$ hydrocarbyl radicals wherein one or more hydrogen atoms is replaced by a halogen radical, an amido radical, a phosphido radical, an alkoxy radical or any other radical containing a Lewis acidic or basic functionality, and "z" is the coordination number of the element J;

Each Q is, independently, any univalent anionic ligand such as halogen, hydride, or substituted or unsubstituted $C_1$–$C_{20}$ hydrocarbyl, alkoxide, aryloxide, amide, arylamide, phosphide or arylphosphide, provided that where any Q is a hydrocarbyl such Q is different from $(C_5H_{5-y-x}R_x)$ or both Q together may be an alkylidene or a cyclometallated hydrocarbyl or any other divalent anionic chelating ligand.

"y" is 0 or 1 when w is greater than 0; y is 1 when w is 0; when "y" is 1, T is a covalent bridging group containing a Group IV A or V A element such as, but not limited to, a dialkyl, alkylaryl or diaryl silicon or germanium radical, alkyl or aryl phosphine or amine radical, or a hydrocarbyl radical such as methylene, ethylene and the like.

L is a Lewis base such as diethylether, tetraethylammonium chloride, tetrahydrofuran, dimethylaniline, aniline, trimethylphosphine, n-butylamine, and the like; and "w" is a number from 0 to 3; L can also be a second transition metal compound of the same type such that the two metal centers M and M' are bridged by Q and Q', wherein M' has the same meaning as M and Q' has the same meaning as Q. Such compounds are represented by the formula:

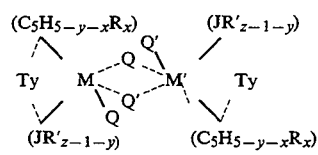

A preferred activator is an alumoxane component which may be represented by the formulas: $(R^3-Al-O)_m$; $R^4(R^5-Al-O)_m-AlR^6_2$ or mixtures thereof, wherein $R^3$-$R^6$ are, independently, a univalent anionic ligand such as a $C_1$—$C_5$ alkyl group or halide and "m" is an integer ranging from 1 to about 50 and preferably is from about 13 to about 25.

Examples of the T group which are suitable as a constituent group of the Group IV B transition metal component of the catalyst system are identified in Column 1 of Table 1 under the heading "T".

nent of the catalyst system are identified in Column 4 of Table 1 under the heading "Q".

Suitable hydrocarbyl and substituted hydrocarbyl radicals, which may be substituted as an R group for at least one hydrogen atom in the cyclopentadienyl ring, will contain from 1 to about 20 carbon atoms and include straight and branched alkyl radicals, cyclic hydrocarbon radicals, alkyl-substituted cyclic hydrocar-

TABLE 1

| T (when y = 1) | $(C_5H_{5-y-x}R_x)$ | $(JR'_{z-1-y})$ | Q | M |
|---|---|---|---|---|
| dimethylsilyl | cyclopentadienyl | t-butylamido | hydride | zirconium |
| diethylsilyl | methylcyclopentadienyl | phenylamido | chloro | hafnium |
| di-n-propylsilyl | 1,2-dimethylcyclopentadienyl | p-n-butylphenylamido | methyl | titanium |
| diisopropylsilyl | 1,3-dimethylcyclopentadienyl | cyclohexylamido | ethyl | |
| di-n-butylsilyl | indenyl | perflurophenylamido | phenyl | |
| di-t-butylsilyl | 1,2-diethylcyclopentadienyl | n-butylamido | fluoro | |
| di-n-hexylsilyl | tetramethylcyclopentadienyl | methylamido | bromo | |
| methylphenylsilyl | ethylcyclopentadienyl | ethylamido | iodo | |
| ethylmethylsilyl | n-butylcyclopentadienyl | n-propylamido | n-propyl | |
| diphenylsilyl | cyclohexylmethylcyclopentadienyl | isopropylamido | isopropyl | |
| di(p-t-butylphenethylsilyl) | n-octylcyclopentadienyl | benzylamido | n-butyl | |
| n-hexylmethylsilyl | beta-phenylpropylcyclopentadienyl | t-butylphosphido | amyl | |
| cyclopentamethylenesilyl | tetrahydroindenyl | ethylphosphido | isoamyl | |
| cyclotetramethylenesilyl | propylcyclopentadienyl | phenylphosphido | hexyl | |
| cyclotrimethylenesilyl | t-butylcyclopentadienyl | cyclohexylphosphido | isobutyl | |
| dimethylgermanyl | benzylcyclopentadienyl | oxo (when y = 1) | heptyl | |
| diethylgermanyl | diphenylmethylcyclopentadienyl | sulfido (when y = 1) | octyl | |
| phenylamido | trimethylgermylcyclopentadienyl | methoxide (when y = 0) | nonyl | |
| t-butylamido | trimethylstannylcyclopentadienyl | ethoxide (when y = 0) | decyl | |
| methylamido | triethylplumbylcyclopentadienyl | methylthio (when y = 0) | cetyl | |
| t-butylphosphido | trifluoromethylcyclopentadienyl | ethylthio (when y = 0) | methoxy | |
| ethylphosphido | trimethylsilylcyclopentadienyl | | ethoxy | |
| phenylphosphido | pentamethylcyclopentadienyl (when y = 0) | | propoxy | |
| methylene | fluorenyl | | butoxy | |
| dimethylmethylene | octahydrofluorenyl | | phenoxy | |
| diethylmethylene | N,N-dimethylamidocyclopentadienyl | | dimethylamido | |
| ethylene | dimethylphosphidocyclopentadienyl | | diethylamido | |
| dimethylethylene | methoxycyclopentadienyl | | methylethylamido | |
| dipropylethylene | (N,N-dimethylamidomethyl) cyclopentadienyl | | diphenylamido | |
| propylene | | | diphenylphosphido | |
| dimethylpropylene | | | dicyclohexylphosphido | |
| diethylpropylene | | | dimethylphosphido | |
| 1,1-dimethyl-3,3-dimethylpropylene | | | methylidene (both Q) | |
| tetramethyldisiloxane | | | ethylidene (both Q) | |
| 1,1,4,4-tetramethyldisilylethylene | | | propylidene (both Q) | |
| | | | ethyleneglycoldianion (both Q) | |

Exemplary hydrocarbyl radicals for the Q are methyl, ethyl, propyl, butyl, amyl, isoamyl, hexyl, isobutyl, heptyl, octyl, nonyl, decyl, cetyl, 2-ethylhexyl, phenyl and the like, with methyl being preferred. Exemplary halogen atoms for Q include chlorine, bromine, fluorine, and iodine, with chlorine being preferred. Exemplary alkoxides and aryloxides for Q are methoxide, phenoxide and substituted phenoxides such as 4-methylphenoxide. Exemplary amides for Q are dimethylamide, diethylamide, methylethylamide, di-t-butylamide, diisopropylamide and the like. Exemplary amides for Q are dimethylamide, diethylamide, methylethylamide, di-t-butylamide, diisopropylamide and the like. Exemplary aryl amides are diphenylamide and any other substituted phenyl amides. Exemplary phosphides for Q are diphenylphosphide, dicyclohexylphosphide, diethylphosphide, dimethylphosphide and the like. Exemplary alkyldiene radicals for both Q together are methylidene, ethylidene and propylidene. Examples of the Q group which are suitable as a constituent group or element of the Group IV B transition metal compobon radicals, aromatic radicals, alkyl-substituted aromatic radicals, phosphido substituted hydrocarbon radicals, alkoxy substituted hydrocarbon radicals, alkylborido substituted radicals and cyclopentadienyl rings containing one or more fused saturated or unsaturated rings. Suitable organometallic radicals, which may be substituted as an R group for at least one hydrogen atom in the cyclopentadienyl ring include trimethylsilyl, triethylsilyl, ethyldimethylsilyl, methyldiethylsilyl, triphenylgermyl, trimethylgermyl and the like. Other suitable radicals that may be substituted for one or more hydrogen atom in the cyclopentadienyl ring include halogen radicals, amido radicals, phosphido radicals, alkoxy radicals, alkylborido radicals and the like. Examples of cyclopentadienyl ring groups $(C_5H_{5-y-x}R_x)$ which are suitable as a constituent group of the Group IV B transition metal component of the catalyst system are identified in Column 2 of Table 1 under the heading $(C_5H_{5-y-x}R_x)$.

Suitable hydrocarbyl and substituted hydrocarbyl radicals, which may be used as an R' group in the heteroatom J ligand group, will contain from 1 to about 20 carbon atoms and include straight and branched alkyl radicals, cyclic hydrocarbon radicals, alkyl-substituted cyclic hydrocarbon radicals, aromatic radicals, alkyl-substituted aromatic radicals, halogen radicals, amido radicals, phosphido radicals, alkylborido radicals and the like. Examples of heteroatom ligand groups (JR'$_{z-1-y}$) which are suitable as a constituent group of the Group IV B transition metal component of the catalyst system are identified in Column 3 of Table 1 under the heading (JR'z-1-y).

Table 1 depicts representative constituent moieties for the "Group IV B transition metal component", the list is for illustrative purposes only and should not be construed to be limiting in any way. A number of final components may be formed by permuting all possible combinations of the constituent moieties with each other. Illustrative compounds are: dimethylsilyltetramethylcyclopentadienyl-tert-butylamido zirconium dichloride, dimethylsilyltetramethylcyclopentadienyl-tert-butylamido hafnium dichloride, dimethylsilyl-tert-butylcyclopentadienyl-tert-butylamido hafnium dichloride, dimethylsilyltrimethylsilylcyclopentadienyl-tert-butylamido zirconium dichloride, dimethylsilyltetramethylcyclopentadienylphenylamido zirconium dichloride, dimethylsilyltetramethylcyclopentadienyl-phenylamido hafnium dichloride, methylphenylsilyltetramethylcyclopentadienyl-tert-butylamido zirconium dichloride, methylphenylsilyltetramethylcyclopentadienyl-tert-butylamido hafnium dichloride, methylphenylsilyltetramethylcyclopentadienyl-tert-butylamido hafnium dimethyl, dimethylsilyltetramethylcyclopentadienyl-p-n-butylphenylamido zirconium dichloride, dimethylsilyltetramethylcyclopentadienyl-p-n-butylphenylamido hafnium dichloride.

As noted, titanium species of the Group IV B transition metal compound have generally been found to yield catalyst systems which in comparison to their zirconium or hafnium analogues, are of higher activity and α-olefin comonomer incorporating ability. Illustrative, but not limiting of the titanium species which exhibit such superior properties are methylphenylsilyltetramethylcyclopentadienyl-tert-butylamido titanium dichloride, dimethylsilyltetramethylcyclopentadienyl-p-n-butylphenylamido titanium dichloride, dimethylsilyltetramethylcyclopentadienyl-p-methoxyphenylamido titanium dichloride, dimethylsilyl-tert-butylcyclopentadienyl-2,5-di-tert-butylphenylamido titanium dichloride, dimethylsilylindenyl-tert-butylamido titanium dichloride, dimethylsilyltetramethylcyclopentadienylcyclohexylamido titanium dichloride, dimethylsilylfluorenylcyclohexylamido titanium dichloride, dimethylsilyltetramethylcyclopentadienylphenylamido titanium dichloride, dimethylsilyltetramethylcyclopentadienyl-tert-butylamido titanium dichloride, dimethylsilyltetramethylcyclopentadienylcyclododecylamido titanium dichloride, and the like.

For illustrative purposes, the above compounds and those permuted from Table 1 do not include the Lewis base ligand (L). The conditions under which complexes containing Lewis base ligands such as ether or those which form dimers is determined by the steric bulk of the ligands about the metal center. For example, the t-butyl group in Me$_2$Si(Me$_4$C$_5$)(N-t-Bu)ZrCl$_2$ has greater steric requirements than the phenyl group in Me$_2$Si(Me$_4$C$_5$) (NPh) ZrCl$_2$.Et$_2$O thereby not permitting ether coordination in the former compound. Similarly, due to the decreased steric bulk of the trimethylsilylcyclopentadienyl group in [Me$_2$Si(Me$_3$SiC$_5$H$_3$) (N-t-Bu)ZrCl$_2$]$_2$ versus that of the tetramethylcyclopentadienyl group in Me$_2$Si (Me$_4$C$_5$) (N-t-Bu)ZrCl$_2$, the former compound is dimeric and the latter is not.

Generally the bridged species of the Group IV B transition metal compound ("y"=1) are preferred. These compounds can be prepared by reacting a cyclopentadienyl lithium compound with a dihalo compound whereupon a lithium halide salt is liberated and a monohalo substituent is covalently bound to the cyclopentadienyl compound. The substituted cyclopentadienyl reaction product is next reacted with a lithium salt of a phosphide, oxide, sulfide or amide (for the sake of illustrative purposes, a lithium amide) whereupon the halo element of the monohalo substituent group of the reaction product reacts to liberate a lithium halide salt and the amine moiety of the lithium amide salt is covalently bound to the substituent of the cyclopentadienyl reaction product. The resulting amine derivative of the cyclopentadienyl product is then reacted with an alkyl lithium reagent whereupon the labile hydrogen atoms, at the carbon atom of the cyclopentadienyl compound and at the nitrogen atom of the amine moiety covalently bound to the substituent group, react with the alkyl of the lithium alkyl reagent to liberate the alkane and produce a dilithium salt of the cyclopentadienyl compound. Thereafter the bridged species of the Group IV B transition metal compound is produced by reacting the dilithium salt cyclopentadienyl compound with a Group IV B transition metal preferably a Group IV B transition metal halide.

Unbridged species of the Group IV B transition metal compound can be prepared from the reaction of a cyclopentadienyl lithium compound and a lithium salt of an amine with a Group IV B transition metal halide.

Suitable, but not limiting, Group IV B transition metal compounds which may be utilized in the catalyst system of this invention include those bridged species ("y"=1) wherein the T group bridge is a dialkyl, diaryl or alkylaryl silane, or methylene or ethylene. Exemplary of the more preferred species of bridged Group IV B transition metal compounds are dimethylsilyl, methylphenylsilyl, diethylsilyl, ethylphenylsilyl, diphenylsilyl, ethylene or methylene bridged compounds. Most preferred of the bridged species are dimethylsilyl, diethylsilyl and methylphenylsilyl bridged compounds.

Suitable Group IV B transition metal compounds which are illustrative of the unbridged ("y"=0) species which may be utilized in the catalyst systems of this invention are exemplified by pentamethylcyclopentadienyldi-t-butylphosphinodimethyl hafnium; pentamethylcyclopentadienyldi-t-butylphosphinomethylethyl hafnium; cyclopentadienyl-2-methylbutoxide dimethyl titanium.

To illustrate members of the Group IV B transition metal component, select any combination of the species in Table 1. An example of a bridged species would be dimethylsilylcyclopentadienyl-t-butylamidodichloro zirconium; an example of an unbridged species would be cyclopentadienyldi-t-butylamidodichloro zirconium.

Those species of the Group IV B transition metal component wherein the metal is titanium have been found to impart beneficial properties to a catalyst system which are unexpected in view of what is known about the properties of bis(cyclopentadienyl) titanium compounds which are cocatalyzed by alumoxanes. Whereas titanocenes in their soluble form are generally unstable in the presence of aluminum alkyls, the monocyclopentadienyl titanium metal components of this invention, particularly those wherein the heteroatom is nitrogen, generally exhibit greater stability in the presence of aluminum alkyls and higher catalyst activity rates.

Further, the titanium species of the Group IV B transition metal component catalyst of this invention generally exhibit higher catalyst activities and the production of polymers of greater molecular weight than catalyst systems prepared with the zirconium or hafnium species of the Group IV B transition metal component.

Generally, wherein it is desired to produce an α-olefin copolymer which incorporates a high content of α-olefin, while maintaining high molecular weight polymer the species of Group IV B transition metal compound preferred is one of titanium. The most preferred species of titanium metal compounds are represented by the formula:

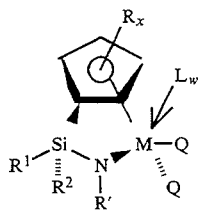

wherein Q, L, R', R, "x" and "w" are as previously defined and $R^1$ and $R^2$ are each independently a $C_1$ to $C_{20}$ hydrocarbyl radicals, substituted $C_1$ and $C_{20}$ hydrocarbyl radicals wherein one or more hydrogen atom is replaced by a halogen atom; $R^1$ and $R^2$ may also be joined forming a $C_3$ to $C_{20}$ ring which incorporates the silicon bridge. Suitable hydrocarbyl and substituted hydrocarbyl radicals which may be used as an R' group have been described previously. Preferred R' groups include those bearing primary carbons bonded directly to the nitrogen atom such as methyl, ethyl, n-propyl, n-butyl, n-hexyl, n-octyl, n-decyl, n-dodecyl, n-tetradecyl, n-hexadecyl, n-octadecyl, benzyl and the like, and those bearing secondary carbons bonded directly to the nitrogen atom such as 2-propyl, 2-butyl, 3-pentyl, 2-heptyl, 2-octyl, cyclopropyl, cyclobutyl, cyclopentyl, cyclohexyl, cycloheptyl, cyclooctyl, cyclododecyl, 2-norbornyl and the like.

Also, the most preferred cyclopentadienyl ring is tetramethylcyclopentadiene (R=Me and x=4).

The alumoxane component of the catalyst system is an oligomeric compound which may be represented by the general formula $(R^3-Al-O)_m$ which is a cyclic compound, or may be $R^4(R^5-Al-O)_m-AlR^6{}_2$ which is a linear compound. An alumoxane is generally a mixture of both the linear and cyclic compounds. In the general alumoxane formula $R^3$, $R^4$, $R^5$, and $R^6$ are, independently a univalent anionic ligand such as a $C_1-C_5$ alkyl radical, for example, methyl, ethyl, propyl, butyl, pentyl or halide and "m" is an integer from 1 to abut 50. Most preferably, $R^3$, $R^4$, $R^5$ and $R^6$ are each methyl and "m" is at least 4. When an alkyl aluminum halide is employed in the preparation of alumoxane, one or more of $R^{3-6}$ could be halide.

As is now well known, alumoxanes can be prepared by various procedures. For example, a trialkyl aluminum may be reacted with water, in the form of a moist inert organic solvent; or the trialkyl aluminum may be contacted with a hydrated salt, such as hydrated copper sulfate suspended in an inert organic solvent, to yield an alumoxane. Generally, however prepared, the reaction of a trialkyl aluminum with a limited amount of water yields a mixture of both the linear and cyclic species of alumoxane.

Suitable alumoxanes which may be utilized in the catalyst systems of this invention are those prepared by the hydrolysis of a alkylaluminum reagent; such as trimethylaluminum, triethylaluminum, tripropylaluminum, triisobutylaluminum, dimethylaluminumchloride, diisobutylaluminumchloride, diethylaluminumchloride, and the like. Mixtures of different alkyl aluminum reagents in preparing an alumoxane may also be used. The most preferred alumoxane for use is methylalumoxane (MAO), particularly methylalumoxanes having a reported average degree of oligomerization of from about 4 to about 25 ("m"=4 to 25) with a range of 13 to 25 being most preferred.

As an alternative to the alumoxane activation, the metallocene component can be ionically activated using the procedures and techniques set forth in Turner et al., U.S. Ser. No. 133,052, filed Dec. 21, 1987 now abandoned; Turner et al., U.S. Ser. No. 133,480, filed Dec. 22, 1987 now abandoned; Canich et al., U.S. Ser. No 542,236, filed Jun. 22, 1990; and EP Publication Nos. 277,004; 418,044; and 426,637; all of which are hereby incorporated by reference. Briefly, for ionic activation, the metallocene has at least one substituent capable of reacting with a proton. The metallocene is activated by reaction with a proton-donating cation and a bulky, non-coordinating anion which stabilizes the metal cation formed by the metallocene-proton reaction. Typically, Q in the above formula is hydrocarbyl, the cation is trialkylammonium, for example, and the anion is tetraperfluorophenyl borate, for example.

CATALYST SYSTEMS

The catalyst systems employed in the method of the invention comprise a complex formed upon admixture of the Group IV B transition metal component with an activating component. The catalyst system may be prepared by addition of the requisite Group IV B transition metal and alumoxane components, or a previously cationically activated Group IV B transition metal component, to an inert solvent in which olefin polymerization can be carried out by a solution, slurry or bulk phase polymerization procedure.

The catalyst system may be conveniently prepared by placing the selected Group IV B transition metal component and the selected alumoxane or ionic activating component(s), in any order of addition, in an alkane or aromatic hydrocarbon solvent, preferably one which is also suitable for service as a polymerization diluent. Where the hydrocarbon solvent utilized is also suitable for use as a polymerization diluent, the catalyst system may be prepared in situ in the polymerization reactor. Alternatively, the catalyst system may be separately prepared, in concentrated form, and added to the polymerization diluent in a reactor. Or, if desired, the components of the catalyst system may be prepared as separate solutions and added to the polymerization diluent in a reactor, in appropriate ratios, as is suitable for a continuous liquid polymerization reaction procedure. Alkane and aromatic hydrocarbons suitable as solvents for formation of the catalyst system and also as a polymerization diluent are exemplified by, but are not necessarily limited to, straight and branched chain hydrocarbons such as isobutane, butane, pentane, hexane, heptane, octane and the like, cyclic and alicyclic hydrocarbons such as cyclohexane, cycloheptane, methylcyclohexane, methylcycloheptane and the like, and aromatic and alkyl-substituted aromatic compounds such as benzene, toluene, xylene and the like. Suitable solvents also include liquid olefins which may act as monomers or comonomers, including ethylene, propylene, 1-butene, 1-hexene and the like, particularly when the catalyst components are prepared as separate solutions, in which case prepared catalyst is added to the monomer mixture in the reactor and polymerization is effected essentially in neat monomer.

In accordance with this invention optimum results are generally obtained wherein the Group IV B transition metal compound is present in the polymerization diluent in a concentration of preferably from abut 0.00001 to about 10.0 millimoles/liter of diluent and the alumoxane component, when used, is present in an amount to provide a molar aluminum to transition metal ratio of from about 0.5:1 to about 20,000:1. Sufficient solvent is normally used so as to provide adequate heat transfer away from the catalyst components during reaction and to permit good mixing.

The catalyst system ingredients, that is, the Group IV B transition metal, the alumoxane and/or ionic activators, and polymerization diluent, can be added to the reaction vessel rapidly or slowly. The temperature maintained during the contact of the catalyst components can vary widely, such as, for example, from −100° C. to 300° C. Greater or lesser temperatures can also be employed. Preferably, during formation of the catalyst system, the reaction is maintained within a temperature of from about 25° C. to 100° C., most preferably about 25° C.

At all times, the individual catalyst system components, as well as the catalyst system once formed, are protected from oxygen and moisture. Therefore, the reactions are performed in an oxygen and moisture free atmosphere and, where the catalyst system is recovered separately it is recovered in an oxygen and moisture free atmosphere. Preferably, therefore, the reactions are performed in the presence of an inert dry gas such as, for example, helium or nitrogen. Inhibitor-free monomers are preferred. Thus, any monomer inhibitors can usually be removed from the monomer just prior to polymerization.

POLYMERIZATION PROCESS

In a preferred embodiment of the process of this invention the catalyst system is utilized in the liquid phase (slurry, solution, suspension or bulk phase or combination thereof), high pressure fluid phase or gas phase copolymerization of ethylene and the branched α-olefin monomer. These processes may be employed singularly or in series. The liquid phase process comprises the steps of contacting a branched α-olefin monomer and ethylene with the catalyst system in a suitable polymerization diluent and reacting said monomers in the presence of said catalyst system for a time and at a temperature sufficient to produce a copolymer of high molecular weight. Conditions most preferred for the copolymerization of ethylene are those wherein ethylene is submitted to the reaction zone at pressures of from about 0.019 psia to about 50,000 psia and the reaction temperature is maintained at from about −100° C. to about 300° C. The aluminum to transition metal molar ratio is preferably from about 1:1 to 18,000 to 1. A more preferable range would be 1:1 to 2000:1. The reaction time can be from 10 seconds to 48 hours, or more, preferably from about 10 seconds to about 4 hours.

Without limiting in any way the scope of the invention, one means for carrying out the process of the present invention for production of a copolymer is as follows: in a stirred-tank reactor liquid α-olefin monomer is introduced, such as 3,5,5-trimethylhexene-1. The catalyst system is introduced via nozzles in either the vapor or liquid phase. Feed ethylene gas is introduced either into the vapor phase of the reactor, or sparged into the liquid phase as is well known in the art. The reactor contains a liquid phase composed substantially of liquid α-olefin comonomer, together with dissolved ethylene gas, and a vapor phase containing vapors of all monomers. The reactor temperature and pressure may be controlled via reflux of vaporizing α-olefin monomer (autorefrigeration), as well as by cooling coils, jackets etc. The polymerization rate is generally controlled by the concentration of catalyst. The ethylene content of the polymer product is determined by the ratio of ethylene to α-olefin comonomer in the reactor, which is controlled by manipulating the relative feed rates of these components to the reactor.

In accordance with another preferred embodiment, the copolymer is prepared by a high pressure process. The high pressure polymerization is completed at a temperature from abut 120° C. to about 350° C., preferably from about 120° C. to about 250° C., and at a pressure of from about 500 bar to about 3500 bar, preferably from about 800 bar to about 2000 bar, in a tubular or stirred autoclave reactor. After polymerization and catalyst deactivation, the product copolymer can be recovered using conventional equipment for polymer recovery, such as, for example, a series of high and low pressure separators wherein unreacted ethylene and branched α-olefin comonomer are flashed off for recycle to the reactor and the polymer obtained extruded in an underwater pelletizer. An advantage of the high pressure process is that the flashing off of the comonomer is relatively effective, particularly at the ratio of comonomer:ethylene used in the copolymerization to obtain the desired higher comonomer incorporation in the copolymer, in distinction from the available prior art catalyst which required a much higher, generally impractical ratio of comonomer:ethylene to facilitate such a separation and recycle (and it was still generally not possible to obtain the high $M_w$, narrow MWD copolymers of the present invention). Pigments, antioxidants and other known additives, as are known in the art, can be added to the polymer, generally subsequent to the polymerization step.

As before noted, a catalyst system wherein the Group IV B transition metal component is a titanium species has the ability to incorporate relatively high contents of branched α-olefin comonomers. Accordingly, the selection of the Group IV B transition metal component is another parameter which may be utilized as a control over the ethylene content of a copolymer within a reasonable ratio of ethylene to branched α-olefin comonomer.

EXAMPLES

CATALYST PREPARATION EXAMPLE 1

All catalyst preparation and polymerization procedures were performed under an inert atmosphere of helium or nitrogen. Solvent choices were often optional, for example, in most cases either pentane or petroleum ether could be interchanged. The choice between tetrahydrofuran (THF) and diethyl ether was a bit more restricted, but in several reactions, either could be used. The lithiated amides were prepared from the corresponding amines and either n-butyllithium (n-BuLi) or methyllithium (MeLi). Tetramethylcyclopentadienyllithium ($C_5Me_4HLi$) was prepared according to the procedures of C. M. Fendrick et al., *Organometallics*, 1984, 3, 819 and F. H. Kohler and K. H. Doll, Z *Naturforsch*, 1982, 376, 144. Other lithiated substituted cyclopentadienyl compounds were generally prepared from the corresponding cyclopentadienyl ligand and n-BuLi or MeLi, or by reaction of MeLi with the proper fulvene. $TiCl_4$ was typically used in its etherate form. The etherate was generally prepared by simply adding $TiCl_4$ to ether, filtering off the solid product and vacuum drying. $TiCl_4$, $ZrCl_4$, $HfCl_4$, amines, silanes, substituted and unsubstituted cyclopentadienyl compounds or precursors, and lithium reagents were purchased from Aldrich Chemical Company or Petrarch Systems. Methylalumoxane was supplied by either Schering or Ethyl Corporation.

$C_5Me_4HLi$ (10.0 g, 0.078 mol) was slowly added to $Me_2SiC_2$ (11.5 ml, 0.095 mol, in 225 ml of THF solution). The solution was stirred for 1 hour to assure a complete reaction. The solvent was then removed in vacuo. Pentane was added to precipitate the LiCl. The mixture was filtered through diatomaceous earth and the solvent was removed from the filtrate in vacuo. Tetramethylcyclopentadienyldimethylchlorosilane, ($C_5Me_4H)SiMe_2Cl$, (15.34 g, 0.071 mol) was recovered as a pale yellow liquid.

$(C_5Me_4H)SiMe_2Cl$ (8.0 g, 0.037 mol) was slowly added to a suspension of lithium cyclododecylamine ($LiHNC_{12}H_{23}$) (7.0 g, 0.037 mol, ~80 ml THF). The mixture was stirred overnight. The THF was then removed by vacuum to a cold trap held at $-196°$ C. A mixture of petroleum ether and toluene was added to precipitate the LiCl. The mixture was filtered through diatomaceous earth. The solvent was removed from the filtrate. Tetramethylcyclopentadienyl amidocyclododecyldimethylsilane, $Me_2Si(C_5Me_4H)(NHC_{12}H_{23})$, (11.8 g, 0.033 mol) was isolated as a pale yellow liquid.

$Me_2Si(C_5ME_4H)$ $(NHC_{12}H_{23})$ (11.9 g, 0.033 mol) was diluted with ~150 ml of ether. MeLi (1.4M, 47 ml, 0.066 mol) was added slowly, and the mixture was stirred for 2 hours. The ether was reduced in volume by evaporation. The product was filtered off. The product $[Me_2Si(C_5Me_4)$ $(NC_{12}H_{23})]Li_2$, was washed with several small portions of ether, then vacuum dried to yield 11.1 g (0.030 mol).

$[Me_2Si(C_5Me_4)$ $(NC_{12}H_{23})]Li_2$ (3.0 g, 0.008 mol) was suspended in cold ether. $TiCl_4 \cdot 2Et_2O$ (2.7 g, 0.008 mol) was slowly added and the resulting mixture was stirred overnight. The ether was removed via a vacuum to a cold trap held at $-196°$ C. Methylene chloride was added to precipitate the LiCl. The mixture was filtered through diatomaceous earth. The solvent was significantly reduced in volume by evaporation and petroleum ether was added to precipitate the product. This mixture was refrigerated prior to filtration in order to maximize precipitation. The solid collected was recrystallized from methylene chloride and $Me_2Si(C_5Me_4)(NC_{12}H_{23})TiCl_2$ was isolated (1.0 g, 2.1 mmol).

POLYMERIZATION EXAMPLES

Polymerization was done in a 1-liter autoclave reactor equipped with a paddle stirrer, an external water jacket for temperature control, a regulated supply of dry nitrogen, ethylene, propylene, 1-butene and hexane, and a septum inlet for introduction of other solvents or comonomers, transition metal compound and alumoxane solutions. The reactor was dried and degassed thoroughly prior to use. A typical run consisted of injecting a quantity of freshly distilled solvent (typically toluene), the comonomer and 6.0 ml of 1.0M methylalumoxane (MAO) into the reactor. The reactor was then heated to 80° C. and the transition metal compound solution and the ethylene at a pressure of 4.08 atm were introduced into the system. The polymerization reaction was limited to 30 minutes. The reaction was ceased by rapidly cooling and venting the system, and the resulting polymer was recovered by evaporating the solvent under a stream of nitrogen.

Remaining process run conditions are given in Table 2 including the amount of transition metal catalyst solution (TMC) used, the amount of methylalumoxane solution used, the Al/Ti molar ratio, the amount of toluene and comonomer used, the polymerization temperature, polymer yield, catalyst efficiencies in terms of kg polymer per mole catalyst·atm·hr and kg polymer per mole catalyst·hr and catalyst reactivity ratio.

For example (see Example 2 in Tables 2 and 3), 390 ml of toluene, 6 ml of 1M MAO and 10 ml of 3,5,5-trimethylhexene-1 were added to the reactor described above. The reactor was heated to 80° C. prior to introducing 1.0 ml of the catalyst stock solution made by dissolving 13.5 mg of the transition metal compound in 10 ml of toluene. The reactor was then immediately pressurized with 4.08 atm of ethylene. The polymerization reaction was limited to 30 minutes after which time the reaction was ceased by rapidly cooling and venting the system. The resulting polymer (40 g) was recovered by solvent evaporation and drying in a vacuum at 30°–60° C., typically 50°–60° C. for 48 hours to 5 days. Catalyst productivity was calculated at 6,950 (kg polymer/mol TMC·atm·hr) and 28,354 (kg polymer/mol TMC·hr). Polymer characteristics include a GPC/DRI PE molecular weight of 103,500 daltons, a molecular weight distribution of 3.6, 2.5 mole percent incorporated 3,5,5-trimethylhexene-1 giving a catalyst reactivity ratio of 24.6 ethylene to 3,5,5-trimethylhexene-1, a polymer density of 0.930 g/ml, and a melting point of 114° C.

TABLE 2

| Ex. | Olefin Used | TMC Stock (mg/ 10 ml) | TMC Stock Used (ml) | TMC Stock Used (mg) | Al/M | Toluene (ml) | Olefin (ml) | Polymer Yield (g) | Productivity (kg P/mol TMC · atm · hr) | Productivity (kg P/mol TMC · hr) |
|---|---|---|---|---|---|---|---|---|---|---|
| 2 | 3,5,5-trimethyl-hexene-1 | 13.5 | 1 | 1.35 | 2127 | 390 | 10 | 40 | 6950 | 28,354 |
| 3 | 3,5,5-trimethyl- | 13.5 | 1 | 1.35 | 2127 | 380 | 20 | 24 | 4170 | 17,013 |

TABLE 2-continued

| Ex. | Olefin Used | TMC Stock (mg/10 ml) | TMC Stock Used (ml) | TMC Stock Used (mg) | Al/M | Toluene (ml) | Olefin (ml) | Polymer Yield (g) | Productivity (kg P/mol TMC · atm · hr) | Productivity (kg P/mol TMC · hr) |
|---|---|---|---|---|---|---|---|---|---|---|
| 4 | hexene-1 5-ethyl-nonene-1 | 13 | 1 | 1.3 | 2208 | 395 | 5 | 23 | 4150 | 16,931 |
| 5 | 5-ethyl-nonene-1 | 13 | 1 | 1.3 | 2208 | 390 | 10 | 35 | 6225 | 25,396 |
| 6 | 5-ethyl-nonene-1 | 13 | 1 | 1.3 | 2208 | 380 | 20 | 36 | 6495 | 26,500 |
| 7 | 3-methyl-pentene-1 | 13 | 1 | 1.3 | 2208 | 390 | 10 | 35 | 6315 | 25,764 |
| 8 | 3-methyl-pentene-1 | 13 | 1 | 1.3 | 2208 | 380 | 20 | 24 | 4430 | 17,667 |

Resulting polymer characteristics are given in Table 3 including weight average molecular weight, molecular weight distribution, comonomer concentration, polymer density, melting point and secondary phase transition temperature ($T_2$).

TABLE 3

| Ex. | Olefin Used | MW[a] (daltons) | MWD | mol % α Olefin | $r_1$ | Polymer Density (g/ml) | $T_m$ (°C.) | $T_2$[b] (°C.) | Modulus (kpsi) | Strain to Break (%) |
|---|---|---|---|---|---|---|---|---|---|---|
| 2 | 3,5,5-trimethyl-hexene-1 | 103,500 | 3.6 | 2.5 | 24.6 | 0.930 | 114 | 50 | >28 | 577 |
| 3 | 3,5,5-trimethyl-hexene-1 | 84,100 | 2.5 | 2.1 | 58.7 | 0.931 | 105 | 62 | — | — |
| 4 | 5-ethyl-nonene-1 | 114,400/ 151,000 | 2.3/ 2.8 | 3.8 | 6.8 | 0.928 | 114 | −20; 55[c] | 11.65 | 511 |
| 5 | 5-ethyl-nonene-1 | 201,000/ 173,000 | 2.6/ 3.1 | 6.0 | 8.4 | 0.920 | — | −38; 42[c] | 5.08 | 648 |
| 6 | 5-ethyl-nonene-1 | 113,400/ 181,000 | 2.4/ 2.7 | 9.0 | 10.9 | 0.889 | 96 | −38; 40[c] | 0.564 | 549 |
| 7 | 3-methyl-pentene-1 | 62,000 | 2.1 | 1.8 | 46.8 | 0.933 | 112 | −17; 50[c] | 28.07 | 572 |
| 8 | 3-methyl-pentene-1 | 51,000 | 2.8 | 4.2 | 39.2 | 0.924 | 99/127 | −10; 48[c] | 10.87 | 538 |

[a]First (or only, where no second figure appears) figure from GPC-Differential Refractive Index (DRI) calibrated to polyethylene universal standards; second figure from GPC-viscometer.
[b]Secondary phase transition temperature.
[c]From tan δ data.

The gel permeation chromatography (GPC) data for the present copolymer is very unusual in that the $M_w$ as determined by GPC with differential refractive index (DRI) measurement yielded artificially low results as compared to the more accurate (but more difficult) viscosity (VIS) measurements. This is apparently due to the size of the comonomer side chain distributed throughout the polymer backbone.

Figure 10:
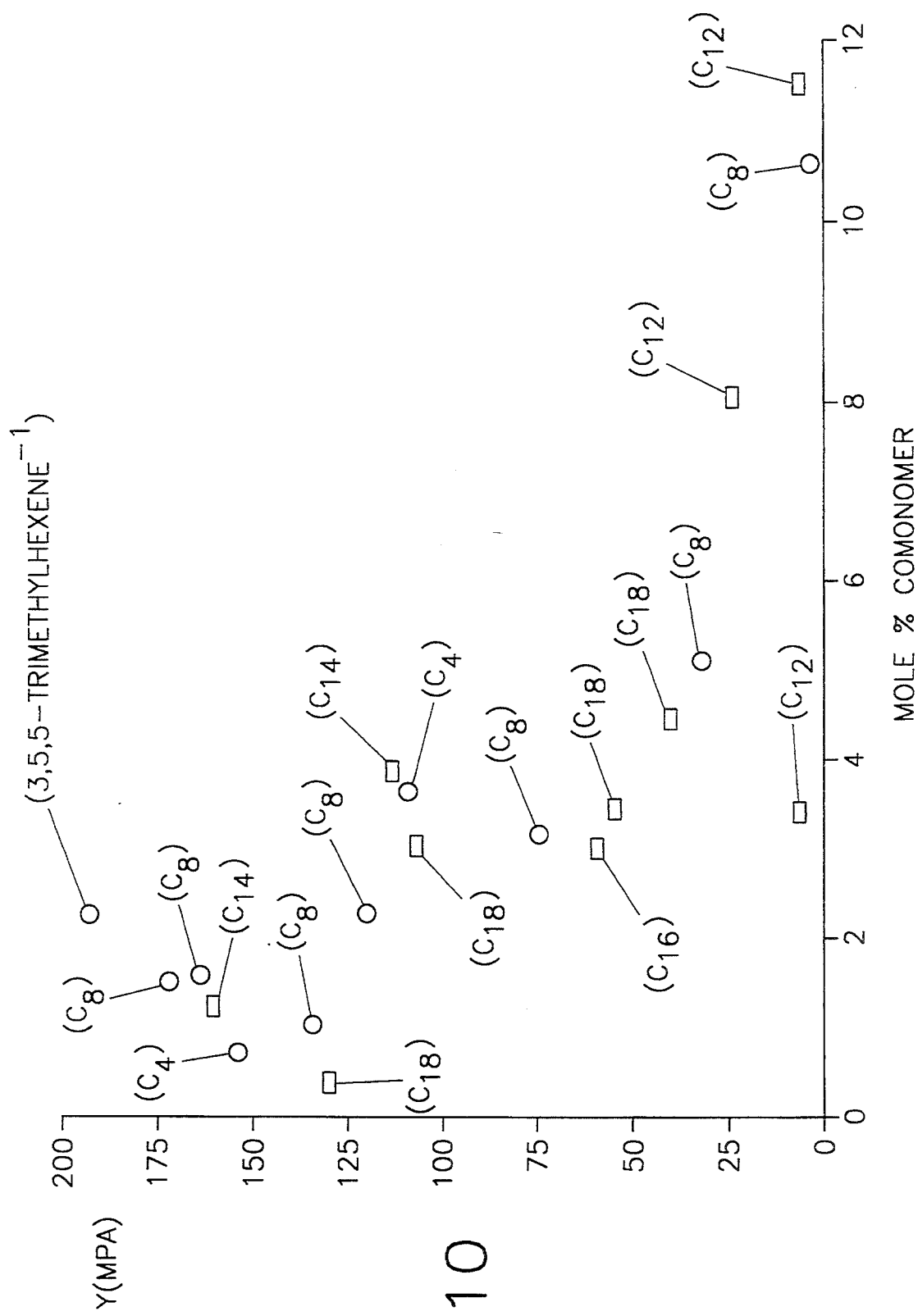
FIG. 10 is a plot comparing initial modulus (Y) versus comonomer content for the ethylene/3,5,5-trimethylhexene-1 copolymer of Example 3 and several ethylene/linear-α-olefin ($C_4-C_{18}$) copolymers having molecular weights between 80,000 and 125,000.

The stress-strain properties of the Example 2 copolymer as reported in Table 3 indicate that the copolymers are extremely tough materials. The modulus of elasticity is very high, and the strain to break is unusual in that it is also high. See FIG. 10 When the material of Example 2 was evaluated in a conventional Instron tensile testing machine, it exhibited unusual strain hardening to the extreme point where the material stiffened and pulled out of the specimen holder before any break could be observed.

Measurements of viscoelastic properties were performed using a PHEOMETRICS SYSTEM IV rheometer or a POLYMER LABORATORIES DMTA rheometer. Isothermal measurements were performed on the SYSTEM IV rheometer over a wide range of temperatures. Isochronal experiments were conducted at a frequency of 10 rad/s and 1 Hz on the SYSTEM IV and the DMTA rheometer, respectively. The storage modulus (E') is determined according to a Polymer Laboratories, Inc. dynamic mechanical thermal analyzer (DMTA) procedures at ambient temperature. The specimen is cast in a Teflon-coated mold, and 12 mm diameter disks are die cut for DMTA testing. E' is understood in the art to be a measurement of the elastic or storage modulus (stress/strain) measured in phase with sinusoidal torsional displacement of the material.

Figure 11:
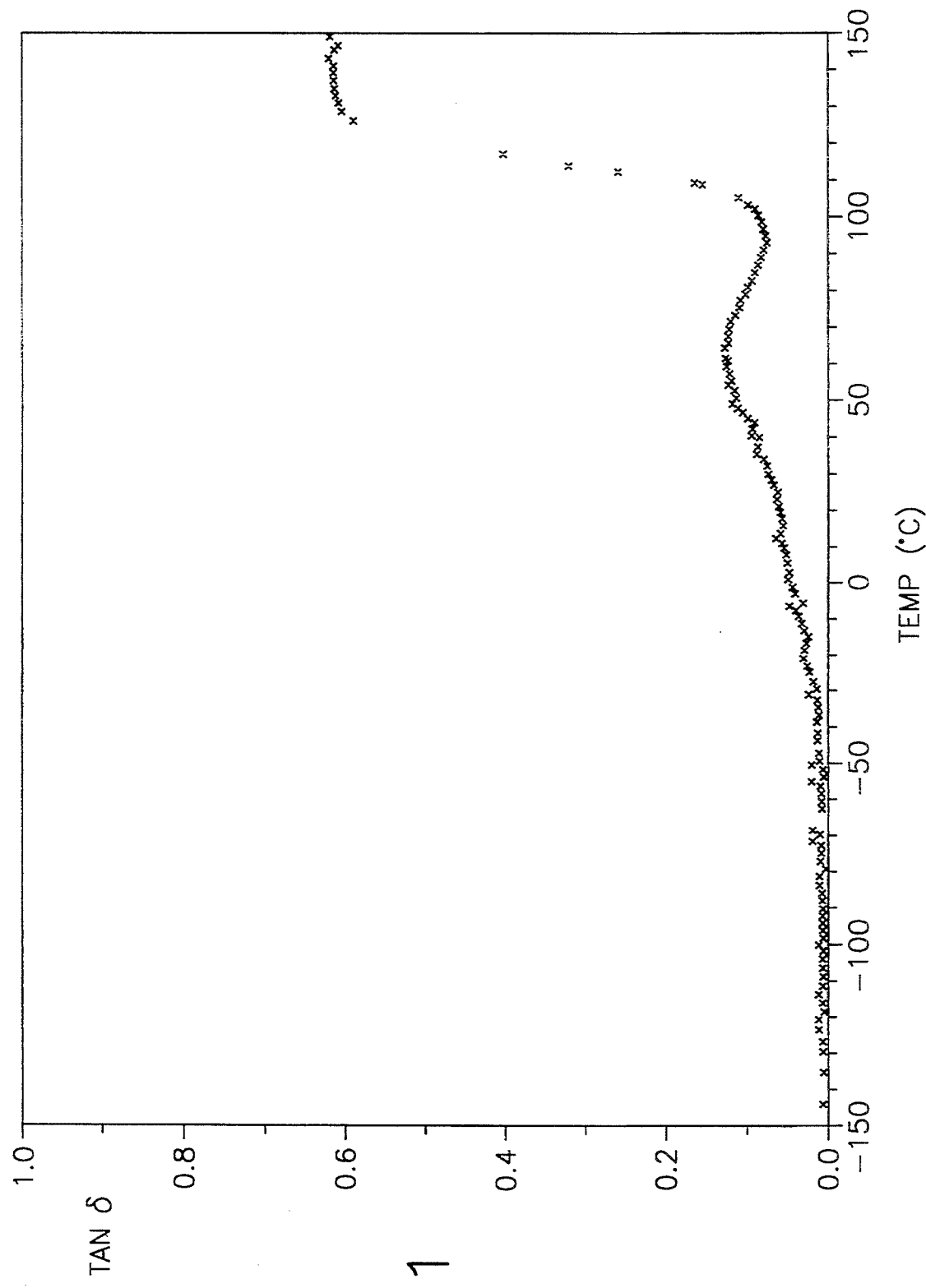
FIG. 11 is a plot of tan δ(1 Hz, 10% torsion strain) versus temperature for the ethylene/3,5,5-trimethylhexane copolymer of Example 3.

The unusual characteristics of the present copolymers are also seen in the storage modulus (E'), loss modulus (E") and tan δ data developed for Examples 3–8 and presented in FIGS. 1–9 and 11 and Table 4. A comparison of the tan δ data in FIGS. 1, 2, 4, 8 and 11 indicates an effect of the positioning of the branches on the side chains with respect to the copolymer backbone. The secondary phase transition temperatures ($T_2$) of the ethylene/5-ethyl-1-nonene copolymer (relatively distant ethyl branch) are generally lower than the conventional LLDPE $T_β$. However, steric hindrances created by methyl branches right up against the backbone of the copolymer are thought to be the reason for the appearance of the secondary phase transition temperatures at about 50° C. in the 3-methylpentene copolymer (FIGS. 4 and 6) and at about 70° C. in the 3,5,5-trimethylhexene-1 copolymer (FIG. 11).

TABLE 4

| POLYMER | STRAIN (%) | TEMP (°C.) | | FREQUENCY (rad/sec) | | | | | | | | | |
|---|---|---|---|---|---|---|---|---|---|---|---|---|---|
| | | | | 0.10 | 0.20 | 0.40 | 1.00 | 2.51 | 10.0 | 39.8 | 100 | 200 | 398 |
| Ex. 5 | 10 | 25° C. | G' (dyne × $10^5$/cm$^2$) | 27.8 | 33.3 | 38.6 | 45.6 | 52.0 | 60.0 | 65.7 | 70.5 | 73.3 | 75.9 |
| | | | G" (dyne × $10^5$/cm$^2$) | 12.2 | 12.0 | 12.1 | 11.7 | 11.0 | 9.66 | 8.73 | 9.15 | 10.5 | 12.9 |
| | | | G"/G' | 0.44 | 0.36 | 0.31 | 0.26 | 0.21 | 0.16 | 0.13 | 0.13 | 0.14 | 0.17 |
| | 10 | 45° C. | G' | 11.4 | 15.3 | 19.6 | 26.2 | 33.1 | 43.4 | 32.7 | 58.0 | 61.0 | 63.6 |
| | | | G" | 8.21 | 9.16 | 10.3 | 11.4 | 11.9 | 11.7 | 10.6 | 8.73 | 9.28 | 9.00 |
| | | | G"/G' | 0.72 | 0.60 | 0.52 | 0.43 | 0.36 | 0.27 | 0.20 | 0.17 | 0.15 | 0.14 |
| | 10 | 85° C. | G' | 4.44 | 6.70 | 9.46 | 14.1 | 19.7 | 29.4 | 39.5 | 46.0 | 50.3 | 54.0 |
| | | | G" | 4.42 | 5.70 | 7.02 | 8.71 | 10.1 | 11.4 | 11.5 | 11.0 | 10.5 | 9.96 |
| | | | G"/G' | 0.99 | 0.85 | 0.74 | 0.62 | 0.50 | 0.39 | 0.29 | 0.29 | 0.21 | 0.18 |
| | 10 | 95° C. | G' | 1.12 | 1.90 | 3.06 | 5.33 | 8.57 | 15.3 | 23.9 | 30.1 | 34.8 | 39.1 |
| | | | G" | 1.74 | 2.49 | 3.42 | 4.89 | 6.51 | 8.84 | 10.4 | 10.9 | 10.9 | 10.7 |
| | | | G"/G' | 1.56 | 1.31 | 1.12 | 0.92 | 0.76 | 0.58 | 0.44 | 0.36 | 0.31 | 0.27 |
| | 10 | 120° C. | G' | 0.383 | 0.675 | 1.23 | 2.48 | 4.54 | 9.42 | 16.4 | 21.9 | 26.2 | 30.5 |
| | | | G" | 0.829 | 1.27 | 1.90 | 3.03 | 4.49 | 6.94 | 9.12 | 9.12 | 10.5 | 10.7 |
| | | | G"/G' | 2.16 | 1.88 | 1.55 | 1.22 | 0.99 | 0.74 | 0.56 | 0.46 | 0.40 | 0.35 |

Many modifications and variations besides the embodiments specifically mentioned may be made in the compositions and methods described herein without substantially departing from the concept of the present invention. Accordingly, it should be clearly understood that the form of the invention described herein is exemplary only, and is not intended as a limitation of the scope thereof.

What is claimed is:

1. A copolymer comprising ethylene and at least about 2.5 to less than 50 mole percent of an α-olefin comonomer having at least two $C_1$ to $C_3$ branches and said copolymer having a composition distribution breadth index within the range of 50% to less than 100%.

2. The copolymer of claim 1 exhibiting a strain hardening characteristic.

3. The copolymer of claim 1 having suppressed phase transitions in the temperature ranges of from about −120° C. to about −90° C. and from about −30° C. to about 20° C.

4. The copolymer of claim 3 having a secondary phase transition temperature in the range of from about −50° C. up to about −30° C.

5. The copolymer of claim 3 having a secondary phase transition temperature in the range of from above about 20° C. to about 80° C.

6. The copolymer of claim 1 comprising at least about 3.0 mole % comonomer.

7. The copolymer of claim 1, wherein the comonomer having two or more branches has at least one alkyl branch adjacent to the α-olefinic unsaturation thereof.

8. The copolymer of claim 7, wherein the alkyl branch has from 1 to 3 carbon atoms and is closer to the α-olefinic unsaturation than a terminal carbon of the longest straight chain of the comonomer.

9. The copolymer of claim 7, wherein the comonomer has from 6 to 14 carbon atoms.

10. The copolymer of claim 1, wherein said branched alpha-olefin has two, three or four alkyl branches and from 6 to 14 carbon atoms.

11. A copolymer of ethylene and from about 0.5 to about 10 mole percent of a branched $C_6$ to $C_{30}$ α-olefin comonomer having three or four branches wherein at least one of the branches is a $C_3$, $C_4$ or $c_5$ lower alkyl and said copolymer having a composition distribution breadth index of within the range of 50% to less than 100%.

12. The copolymer of claim 11, comprising from about 3.0 to about 8 mole percent of the branched α-olefin.

13. The copolymer of claim 1 or 11, further comprising from about 2 to about 25 mole percent of a straight-chained α-olefin.

14. The copolymer of claim 13, wherein the alpha olefin has 3 to 8 carbon atoms and is present at about 2.5 to about 10 mole percent.

15. The copolymer of claim 1 or 11, wherein the comonomer has from 6 to 14 carbon atoms and the branching substituents are selected from the group consisting of methyl, ethyl, propyl and isopropyl.

16. The copolymer of claim 1, wherein the comonomer is selected from the group consisting of 3,4-dimethylpentene-1, 4-methyl-3-ethylpentene-1, and 4,4-dimethyl-3-ethylpentene-1.

17. The copolymer of claim 1, wherein the comonomer is selected from the group consisting of 3,4-dimethylhexene-1, 3,5-dimethylhexene-1, 4-methyl-3-ethylhexene-1, 5-methyl-3-ethylhexene-1, 3-methyl-4-ethylhexene-1, 4-methyl-3-propylhexene-1, 5-methyl-3-propylhexene-1, 3,4-diethylhexene-1, 4-methyl-3-isopropylhexene-1, and 5-methyl-3-isopropylhexene-1.

18. The copolymer of claim 1 or 11, wherein the comonomer is selected from the group consisting of 3,4,4-trimethylhexene-1, 3,4,5-trimethylhexene-1, 3,5,5-trimethylhexene-1, 4,4-dimethyl-3-ethylhexene-1, 4,5-dimethyl-3-ethylhexene-1, 5,5-dimethyl-3-ethylhexene-1, 3,4-dimethyl-4-ethylhexene-1, 3,5-dimethyl-4-ethylhexene-1, 4-methyl-3,4-diethylhexene-1, 5-methyl-3,4-diethylhexene-1, 3-methyl-4,4-diethylhexene-1, 3,4,4-triethylhexene-1, 4,4-dimethyl-3-propylhexene-1, 4,5-dimethyl-3-propylhexene-1, 5,5-dimethyl-3-propylhexene-1, 4,4-dimethyl-3-isopropylhexene-1, 4,4-dimethyl-3-ethylpentene-1 and 5,5-dimethyl-3-isopropylhexene-1.

19. The copolymer of claim 1 or 11, wherein the comonomer is selected from the group consisting of 3,4,4,5-tetramethylhexene-1, 3,4,5,5-tetramethylhexene-1, 4,4,5-trimethyl-3-ethylhexene-1, 4,5,5-trimethyl-3-ethylhexene-1, 3,4,5-trimethyl-4-ethylhexene-1, 3,5,5-trimethyl-4-ethylhexene-1, 4,4,5-trimethyl-3,4-diethylhexene-1, 5,5-dimethyl-3,4-diethylhexene-1, 3,5-dimethyl-4,4-diethylhexene-1, and 5-methyl-3,4,4-triethylhexene-1.

20. The copolymer of claim 1 or 11, wherein the molecular weight is from about 80,000 to about 500,000 daltons.

21. A copolymer of ethylene and 3,5,5-trimethylhexene-1 wherein the content of 3,5,5-trimethylhexene-1 is at least 2.5 to less than 50 mole percent, and said copolymer has a composition distribution breadth index of within the range of 50% to less than 100%.

22. A film comprising the copolymer of claim 1 or 11.

23. A fiber comprising the copolymer of claim 1 or 11.

24. A molded article comprising the copolymer of claim 1 or 11.

25. A film comprising the copolymer of claim 21.

26. A fiber comprising the copolymer of claim 21.

27. A molded article comprising the copolymer of claim 21.

28. The copolymer of claim 1 or 11 wherein the copolymer has a $M_w$ of from about 30,000 to about 1,000,000.

29. The copolymer of claim 1 or 11 wherein the copolymer has a $M_w/M_n$ of from about 2 to about 4.

30. The copolymer of claim 21 having at least about 3.0 mole % comonomer.

* * * * *